United States Patent
Vickers

(10) Patent No.: US 10,472,786 B2
(45) Date of Patent: Nov. 12, 2019

(54) STRUCTURE SUPPORTED CONTAINMENT DIKE

(71) Applicant: P.V. Flood Control Corp., Calgary (CA)

(72) Inventor: Paul Vickers, Calgary (CA)

(73) Assignee: P.V. Flood Control Corp., Calgary, Alberta (CA)

(*) Notice: Subject to any disclaimer, the term of this patent is extended or adjusted under 35 U.S.C. 154(b) by 0 days.

(21) Appl. No.: 15/885,689

(22) Filed: Jan. 31, 2018

(65) Prior Publication Data

US 2018/0155888 A1 Jun. 7, 2018

Related U.S. Application Data

(63) Continuation-in-part of application No. 15/368,363, filed on Dec. 2, 2016, which is a continuation of application No. 15/141,267, filed on Apr. 28, 2016, now Pat. No. 9,528,236.

(60) Provisional application No. 62/155,269, filed on Apr. 30, 2015.

(51) Int. Cl.
 *E02B 3/10* (2006.01)
(52) U.S. Cl.
 CPC .......... *E02B 3/108* (2013.01); *E02B 3/10* (2013.01); *E02B 3/106* (2013.01)
(58) Field of Classification Search
 USPC .................................................. 405/15–17
 See application file for complete search history.

(56) References Cited

U.S. PATENT DOCUMENTS

| 4,158,896 A | * | 6/1979 | Farkas | .............. A47K 3/38 135/90 |
| 4,921,373 A | * | 5/1990 | Coffey | .............. E02B 3/108 256/13 |
| 5,125,767 A | | 6/1992 | Dooleage | |
| 5,605,416 A | | 2/1997 | Roach | |

(Continued)

FOREIGN PATENT DOCUMENTS

| CN | 203546671 U | 4/2014 |
| CN | 204039975 U | 12/2014 |

(Continued)

OTHER PUBLICATIONS

PCT International Search Report and Written Opinion, PCT Application No. PCT/US16/29851, dated Aug. 12, 2016, 21 pages.

(Continued)

*Primary Examiner* — Kyle Armstrong
(74) *Attorney, Agent, or Firm* — Fenwick & West LLP

(57) ABSTRACT

Flexible containment tubes form sections of a dike for fluid containment. Structural supports are inserted into the flexible contain tubes and the tube sealed to form structure supported dike sections. For example, a supporting structure may be configured with a given length and cross sectional diameter to provide structural support to a vinyl-coated polyester tube with a 12-36 inch diameter. The structure is sealed within the tube and, in turn, the tube may be filled with a fluid such as water to create structure supported containment dike. The length of the supporting structure may be selected based on the width of an entryway to create structure supported dike section of a give length that provide a seal across the entryways against floodwaters.

19 Claims, 25 Drawing Sheets

(56) References Cited

U.S. PATENT DOCUMENTS

| | | |
|---|---|---|
| 5,865,564 A | 2/1999 | Miller et al. |
| 5,971,661 A | 10/1999 | Johnson et al. |
| 6,334,736 B1 | 1/2002 | Johnson et al. |
| 6,491,431 B2 | 12/2002 | Merten |
| 6,641,329 B1 | 11/2003 | Clement |
| 7,762,742 B1 | 7/2010 | Smith |
| 9,562,335 B1 * | 2/2017 | Arrington ............... E02B 3/106 |
| 9,562,350 B1 * | 2/2017 | Witt ..................... B01D 29/012 |
| 2005/0260038 A1 | 11/2005 | Sousa Costa |
| 2008/0193229 A1 | 8/2008 | Graham et al. |
| 2008/0253838 A1 | 10/2008 | Salemie |
| 2009/0274519 A1 | 11/2009 | Shaw |
| 2013/0108372 A1 | 5/2013 | Abeles |
| 2014/0010601 A1 | 1/2014 | Bradley, Sr. et al. |
| 2014/0117012 A1 * | 5/2014 | Waid ....................... B65B 67/04 |
| | | 220/9.4 |

FOREIGN PATENT DOCUMENTS

| | | |
|---|---|---|
| CN | 204080734 U | 1/2015 |
| DE | 202014009564 | 2/2015 |
| EP | 1892335 | 2/2008 |
| JP | H11-323936 A | 11/1999 |
| JP | 2006-045772 A | 2/2006 |
| JP | 2009-019480 A | 1/2009 |
| JP | 2015-121048 A | 7/2015 |
| WO | WO 99/41459 A1 | 8/1999 |
| WO | WO 02/40780 A1 | 5/2002 |
| WO | WO 2006/114547 | 11/2006 |
| WO | WO 2015/002536 A1 | 1/2015 |

OTHER PUBLICATIONS

United States Office Action, U.S. Appl. No. 15/368,363, dated Dec. 26, 2017, 5 pages.
European Extended Search Report, European Application No. 16787177.1, dated Feb. 22, 2018, 8 pages.
Chinese First Office Action, Chinese Application No. 2016800081542, dated Jun. 1, 2018, 10 pages.
United States Office Action, U.S. Appl. No. 15/368,363, dated Oct. 24, 2018, 12 pages.

* cited by examiner

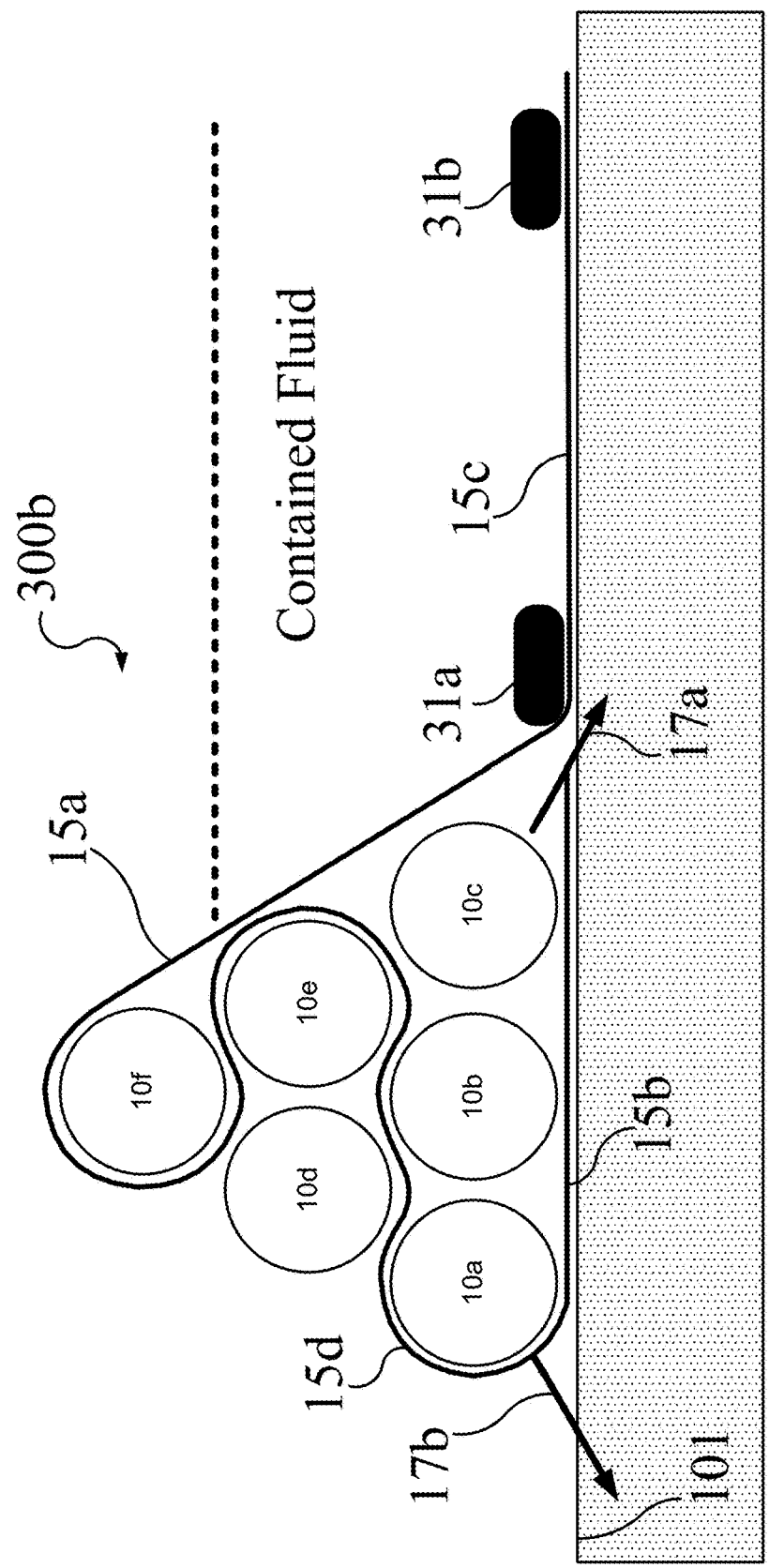

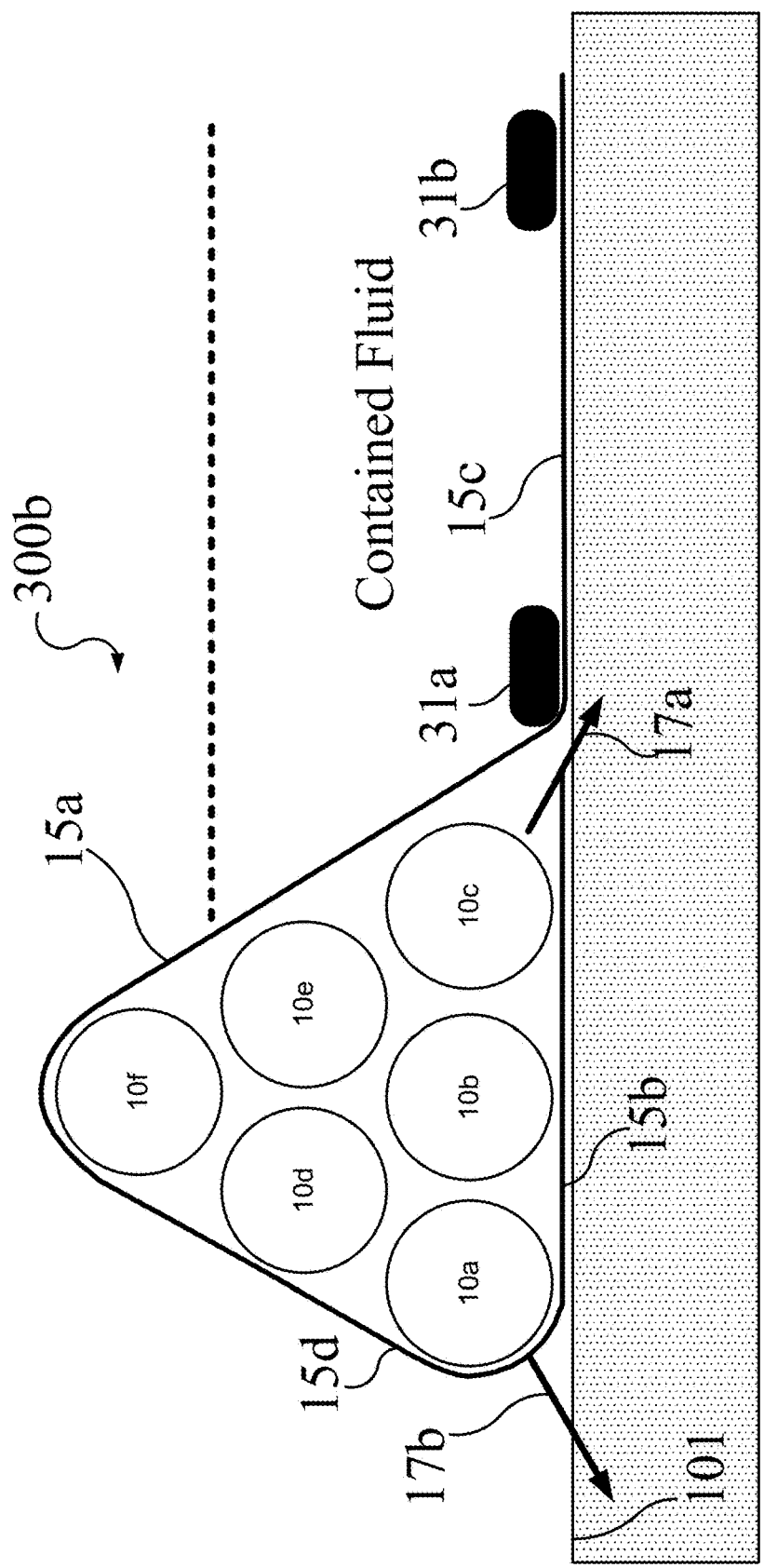
FIG. 3B2

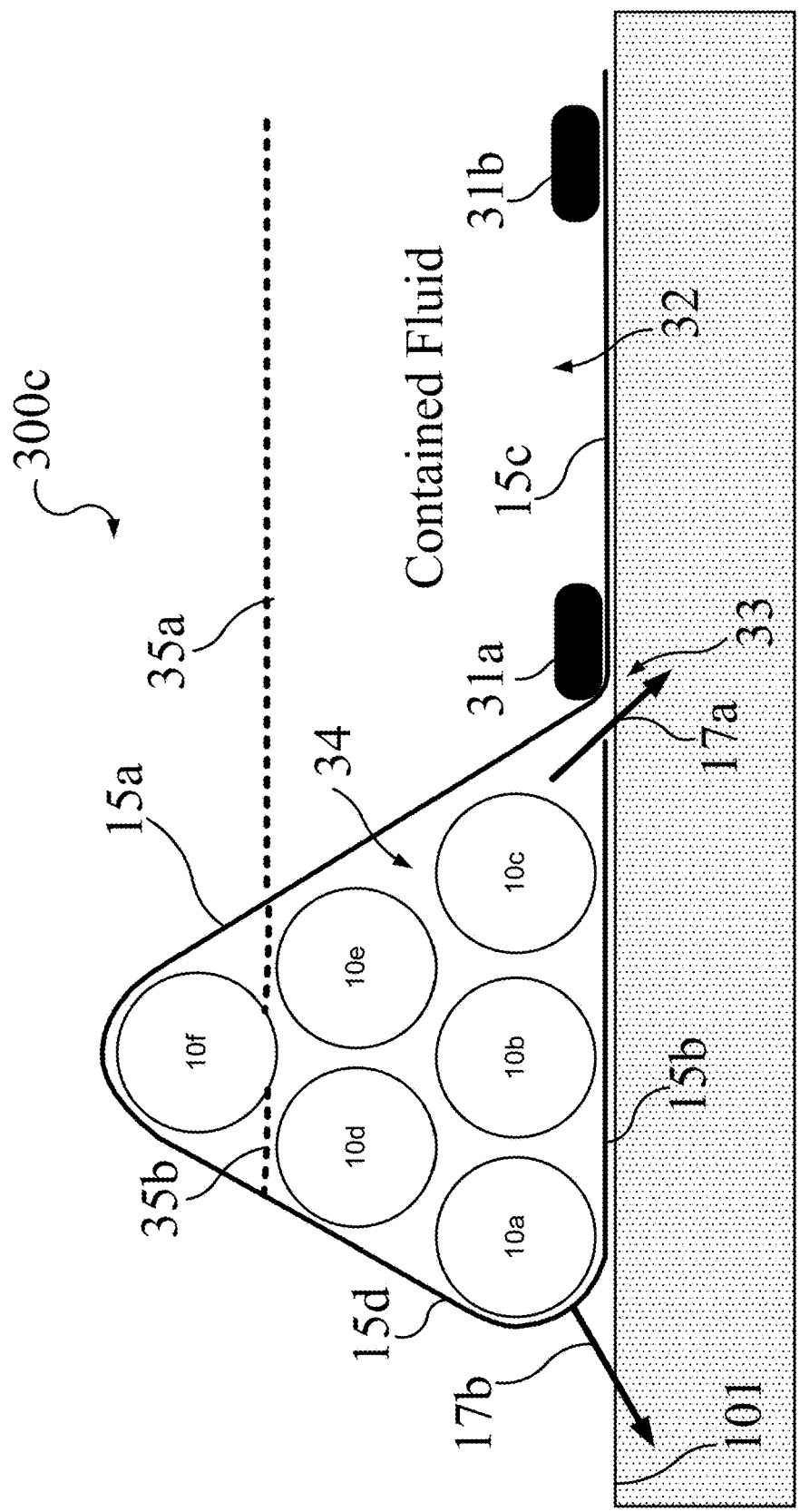
FIG. 3C1

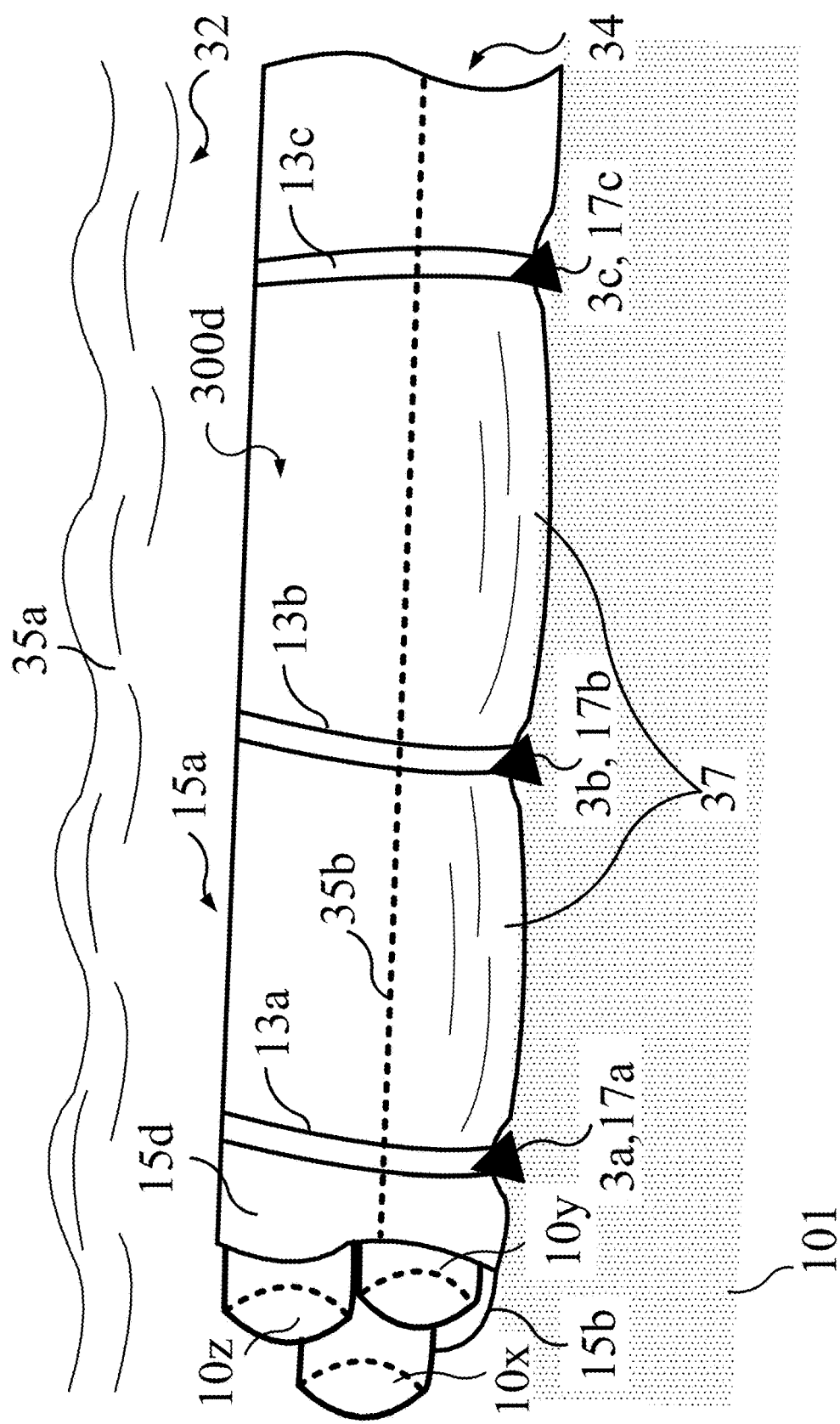
FIG. 3C2

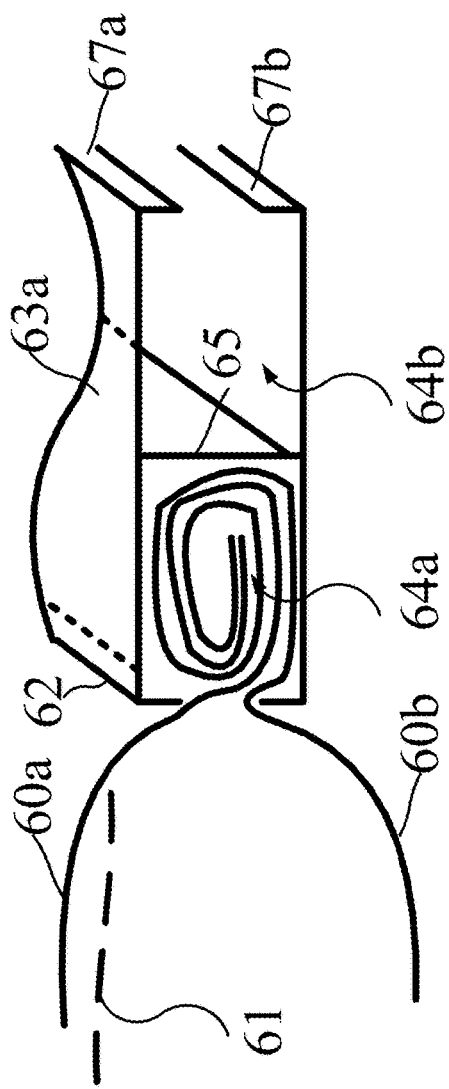
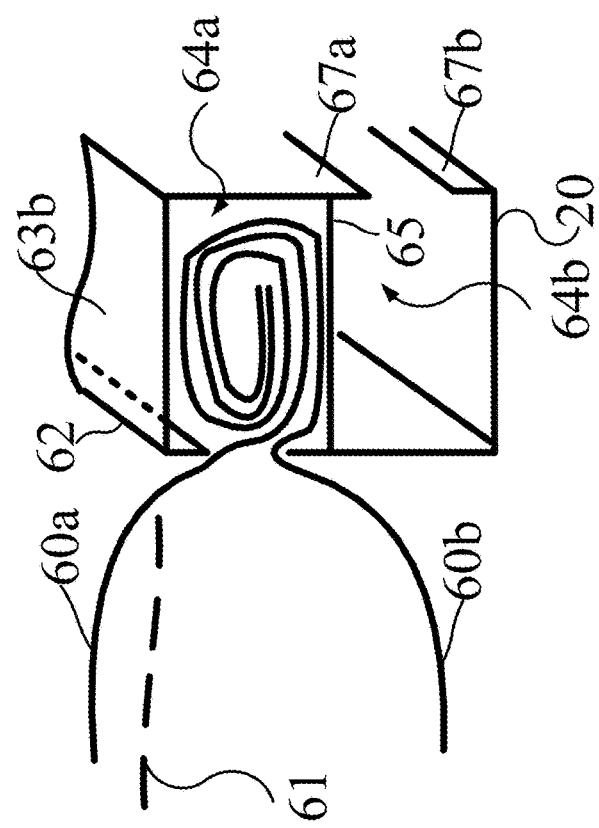
FIG. 6A
FIG. 6B

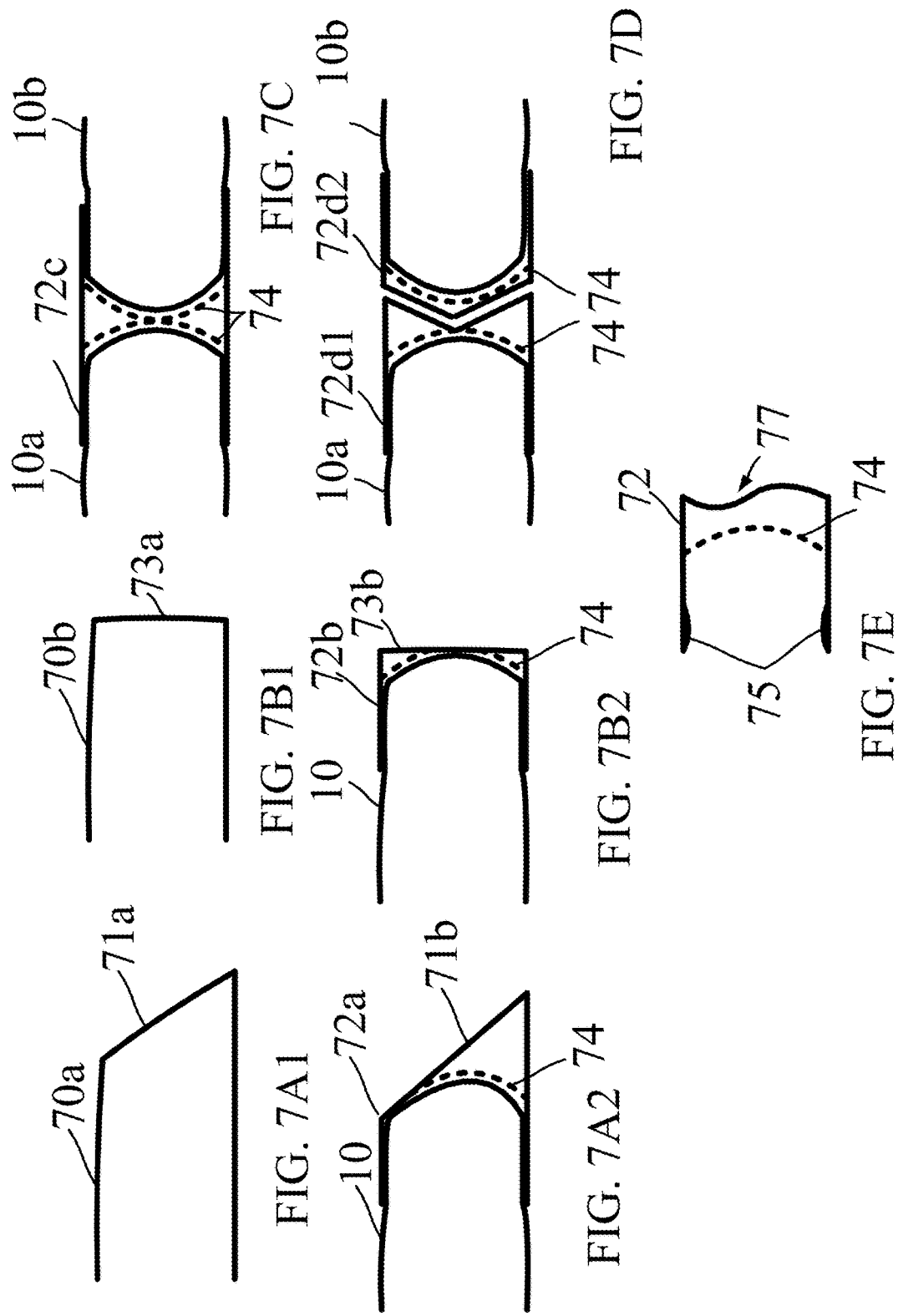

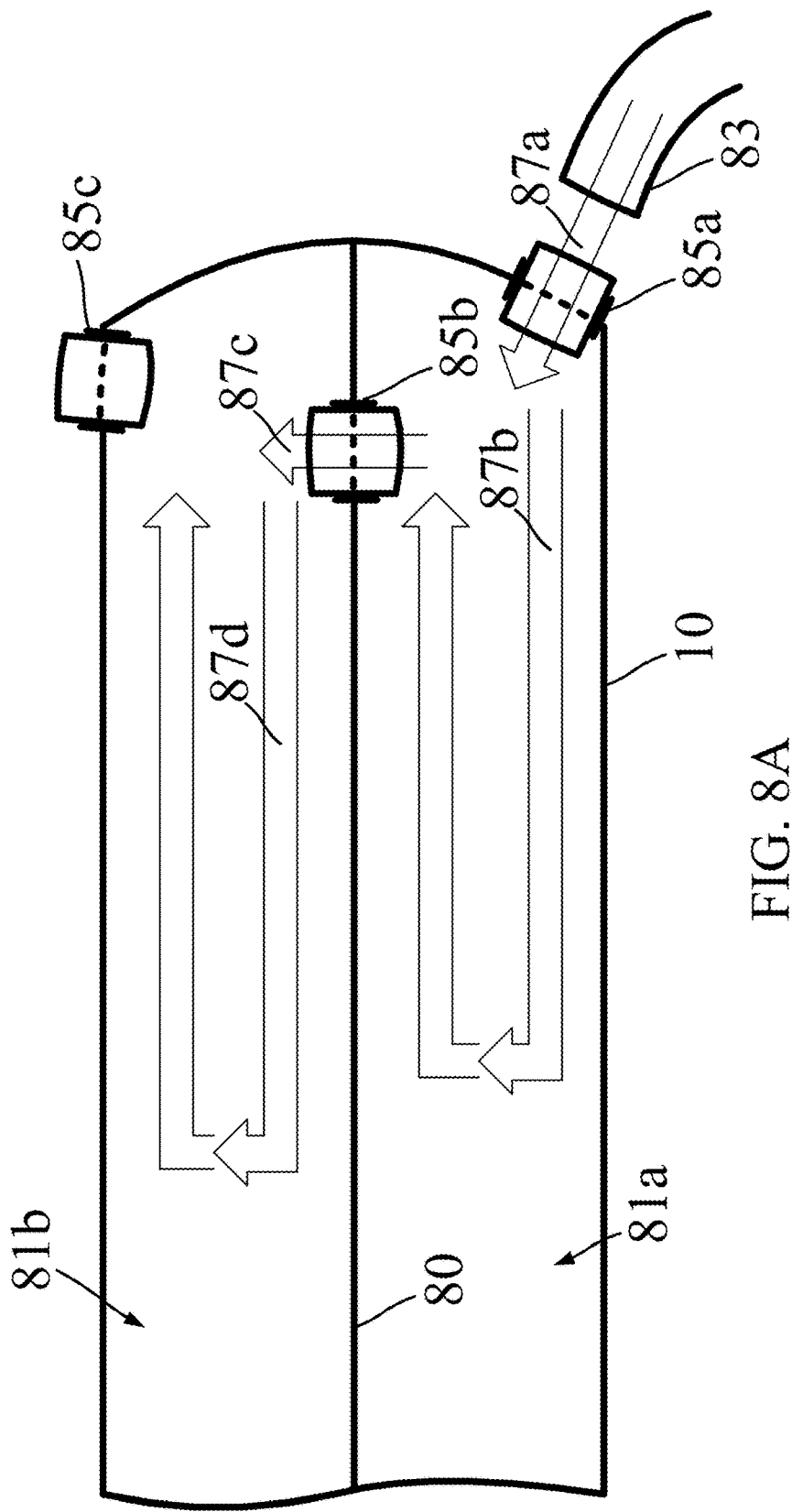

| Fluid Depth (Water) ft | Downward Force from volume of fluid over the dike for 1V:1H in lbs/ft length of dike | 50' of dike |
|---|---|---|
| 2 | 125 | 6240 |
| 3 | 281 | 14040 |
| 4 | 499 | 24960 |
| 5 | 780 | 39000 |
| Fluid Depth (Water) ft | Lateral force lbs/ft length of dike | 50' of dike |
| 2 | 125 | 6240 |
| 3 | 281 | 14040 |
| 4 | 499 | 24960 |
| 5 | 780 | 39000 |

FIG. 10

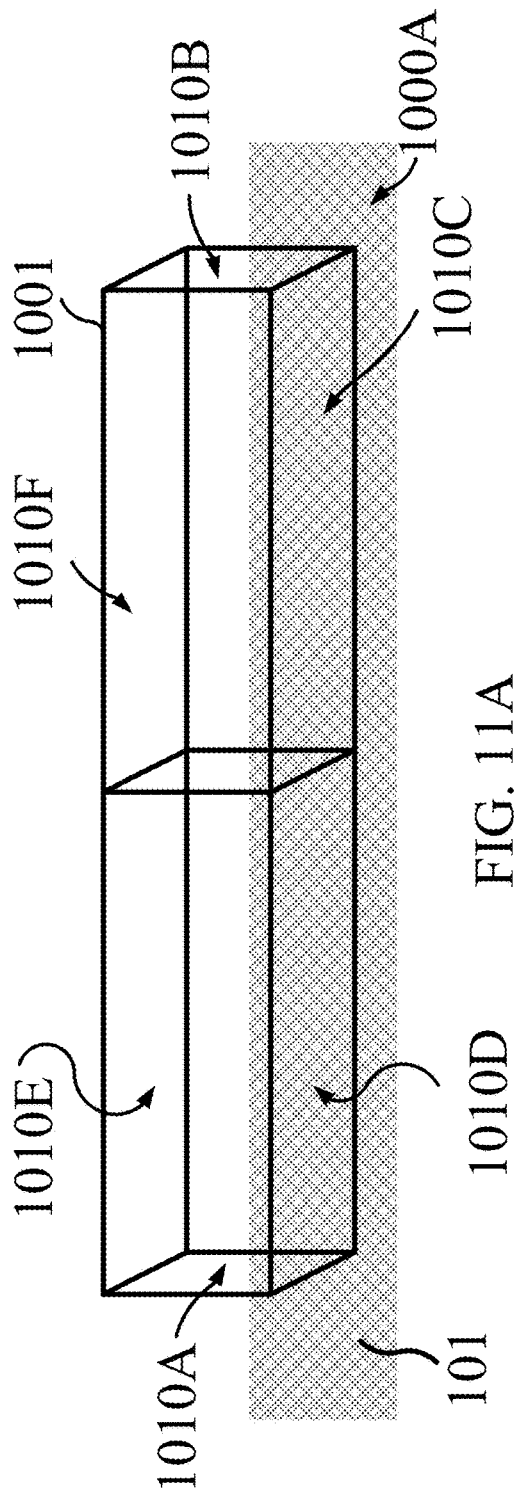
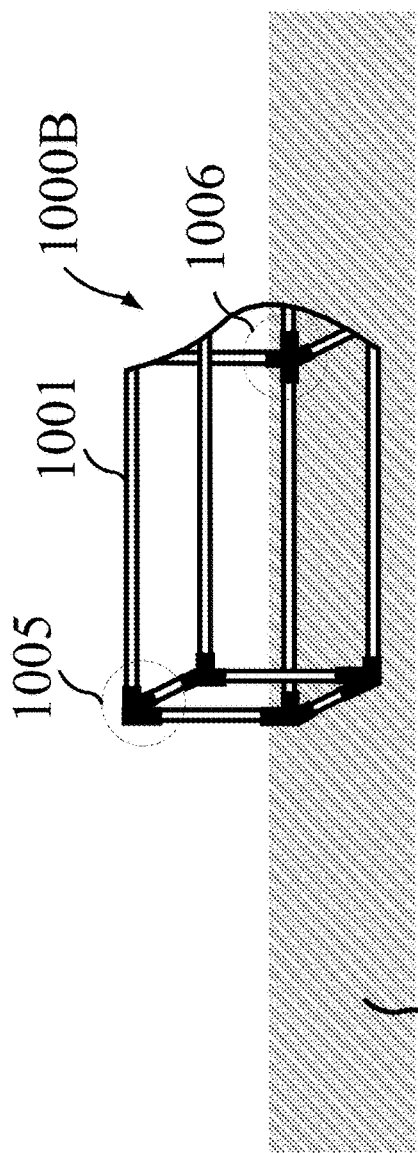
FIG. 11A
FIG. 11B

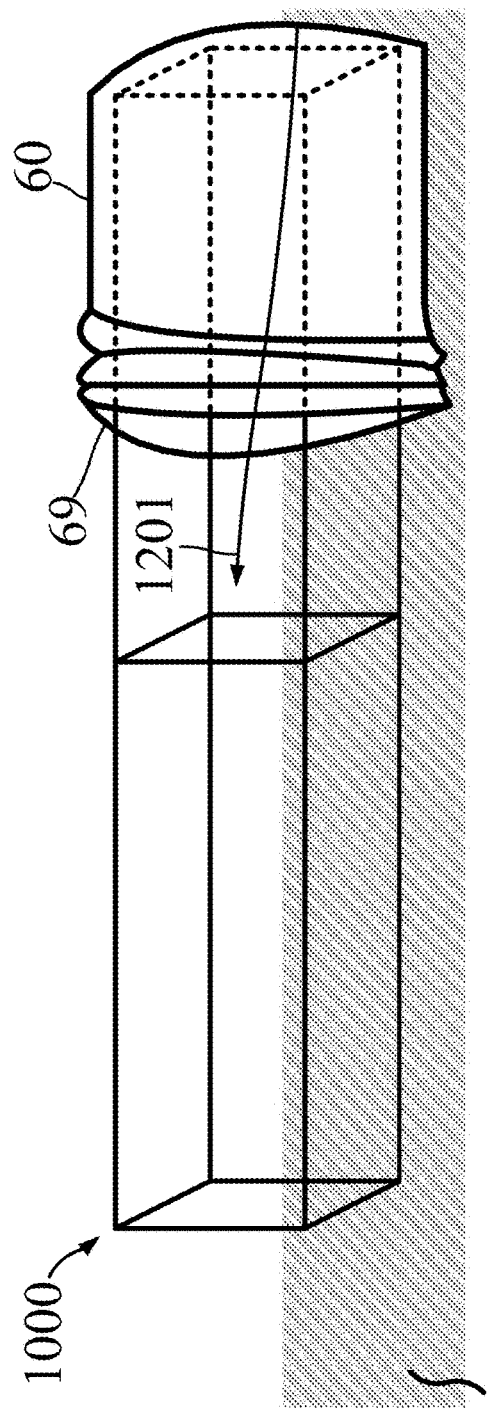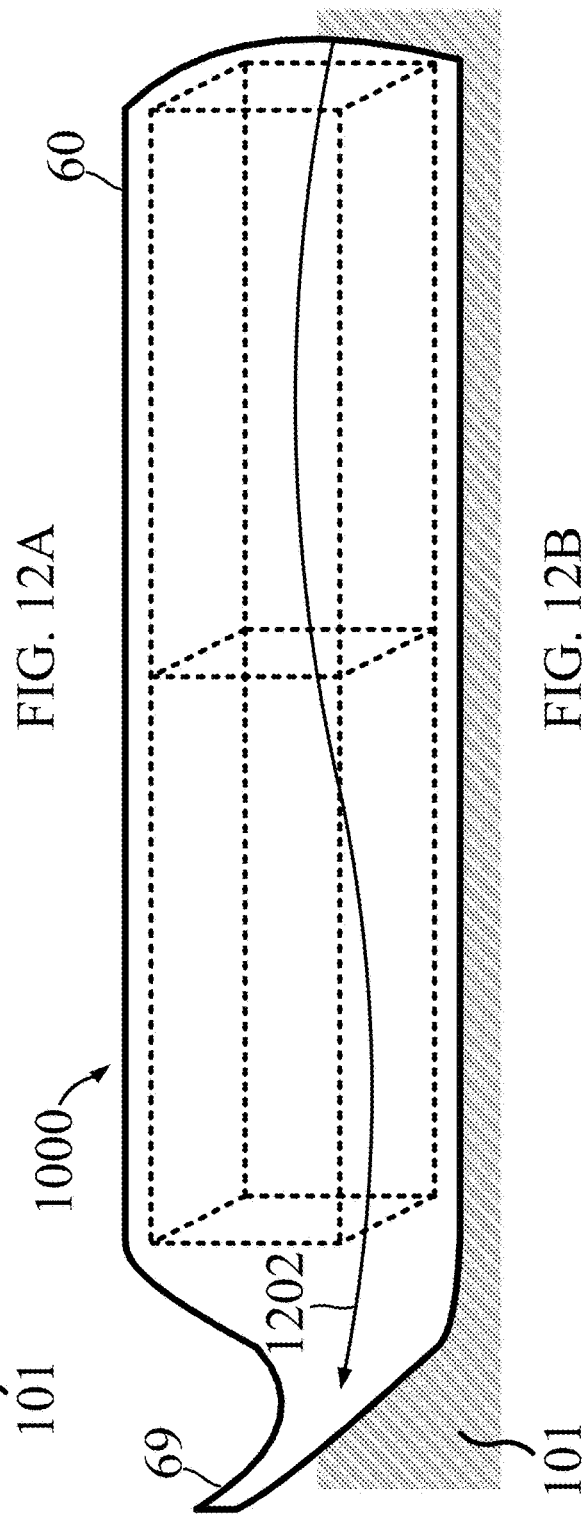
FIG. 12A
FIG. 12B

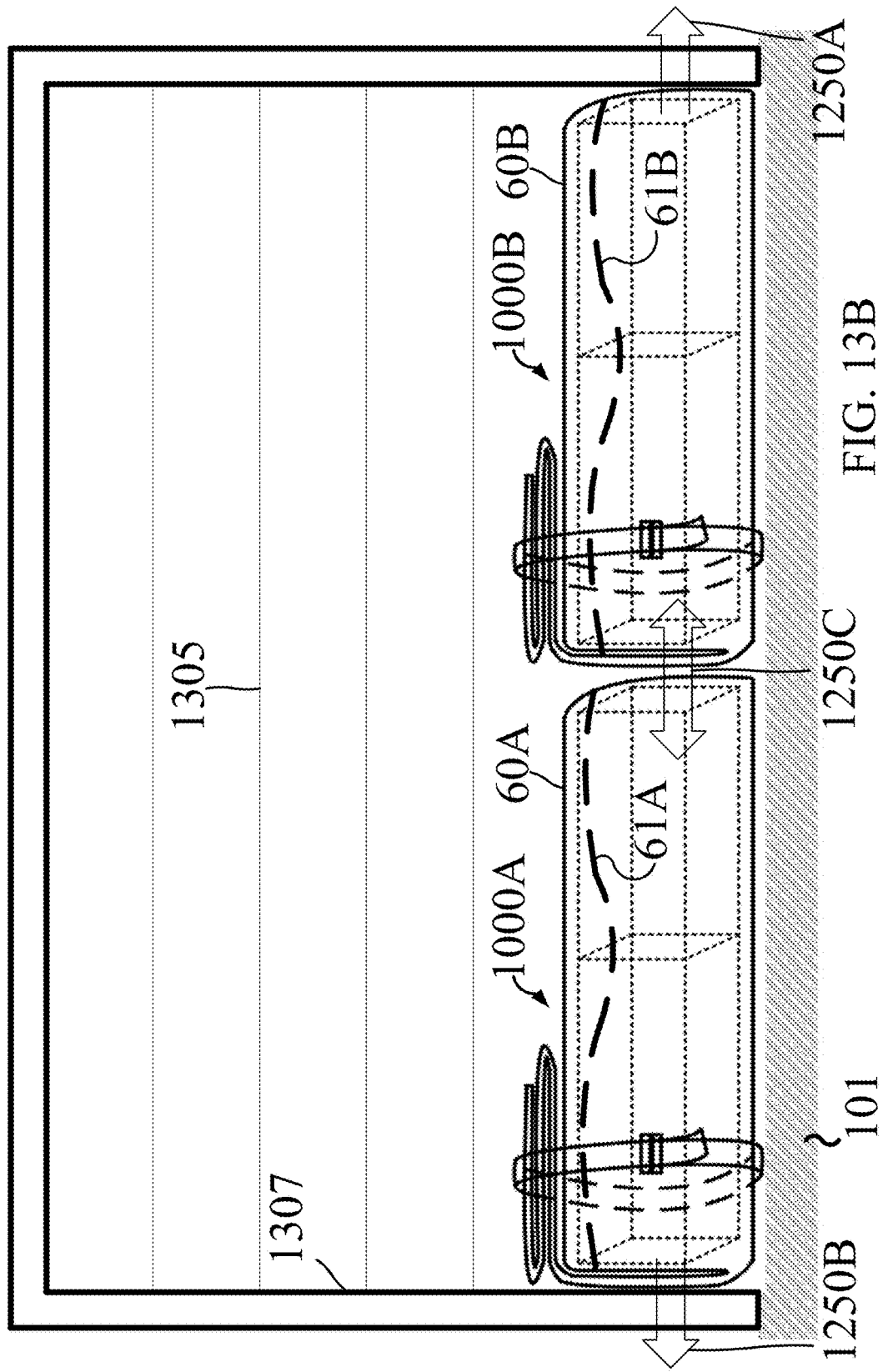

STRUCTURE SUPPORTED CONTAINMENT DIKE

CROSS REFERENCE TO RELATED APPLICATION

This application is a continuation-in-part application of U.S. Utility application Ser. No. 15/368,363, filed on Dec. 2, 2016, which is a continuation application of U.S. Utility application Ser. No. 15/141,267, filed on Apr. 28, 2016, which claims priority to U.S. Provisional Application No. 62/155,269, filed on Apr. 30, 2015, all of which are incorporated by reference herein in their entirety. In addition, this application is related to U.S. Pat. No. 6,641,329, which is incorporated by reference herein in its entirety.

BACKGROUND

1. Field of the Disclosure

The present disclosure relates to flexible containment tubes for dikes and specifically to improving their resiliency and utility in the field.

2. Description of the Related Art

Many systems have been employed for controlling the spread of flood waters or fluid spills. One of the most common means for containing or diverting a flow of liquid is sandbagging where empty bags are filled with sand and piled to form a temporary dike. Sandbagging to temporarily divert liquid flow has certain disadvantages, including the monetary cost of producing the sandbags, monetary cost of sand filler, time cost of filling empty sand bags, and the difficulty of removing filled sand bags when they are no longer required. Additionally, temporary sand bag dikes, while effective at diverting some liquid flow, are not sufficient to contain liquids.

In other areas, specifically those related to longer-term above-ground fluid storage and diversion, expensive infrastructure and/or construction methods are needed to contain and divert fluids. For example, in the case of long term containment, pools are dug out with heavy machinery or permanent containment structures such as tanks are transported and installed or built on site. Such methods, while effective for permanent containment of a fixed amount of liquid or diversion, involve significant cost and man-hours to implement.

BRIEF DESCRIPTION OF THE DRAWINGS

The teachings of the embodiments can be readily understood by considering the following detailed description in conjunction with the accompanying drawings.

FIG. 3B1 and FIG. 3B2 are diagrams illustrating a vapor barrier configuration in constructing a diversion dike according to example embodiments.

FIG. 3C1 and FIG. 3C2 are diagrams illustrating a vapor barrier configuration in constructing a diversion dike according to example embodiments.

FIG. 6A and FIG. 6B are diagrams illustrating flexible containment tube connectors according to example embodiments.

FIG. 7A1, FIG. 7A2, FIG. 7B1, FIG. 7B2, FIG. 7C, FIG. 7D, and FIG. 7E are diagrams illustrating flexible containment tube abutments according to example embodiments.

FIG. 8A, FIG. 8B, and FIG. 8C are diagrams illustrating a valve system of a flexible containment tube according to an example embodiment.

FIG. 10 is a diagram showing the downward force of a contained fluid increasing with the force of hydrostatic pressure as the height of a contained fluid rises.

FIG. 11A, FIG. 11B, and FIG. 11C are diagrams illustrating example supporting structures for a flexible containment tube according to example embodiments.

FIG. 12A, FIG. 12B, FIG. 12C, FIG. 12D, and FIG. 12E are diagrams illustrating an example structure supported containment dike according to example embodiments.

FIG. 13A and FIG. 13B are diagrams illustrating example structure supported containment dike applications according to example embodiments.

DETAILED DESCRIPTION OF EMBODIMENTS

Figure 1:
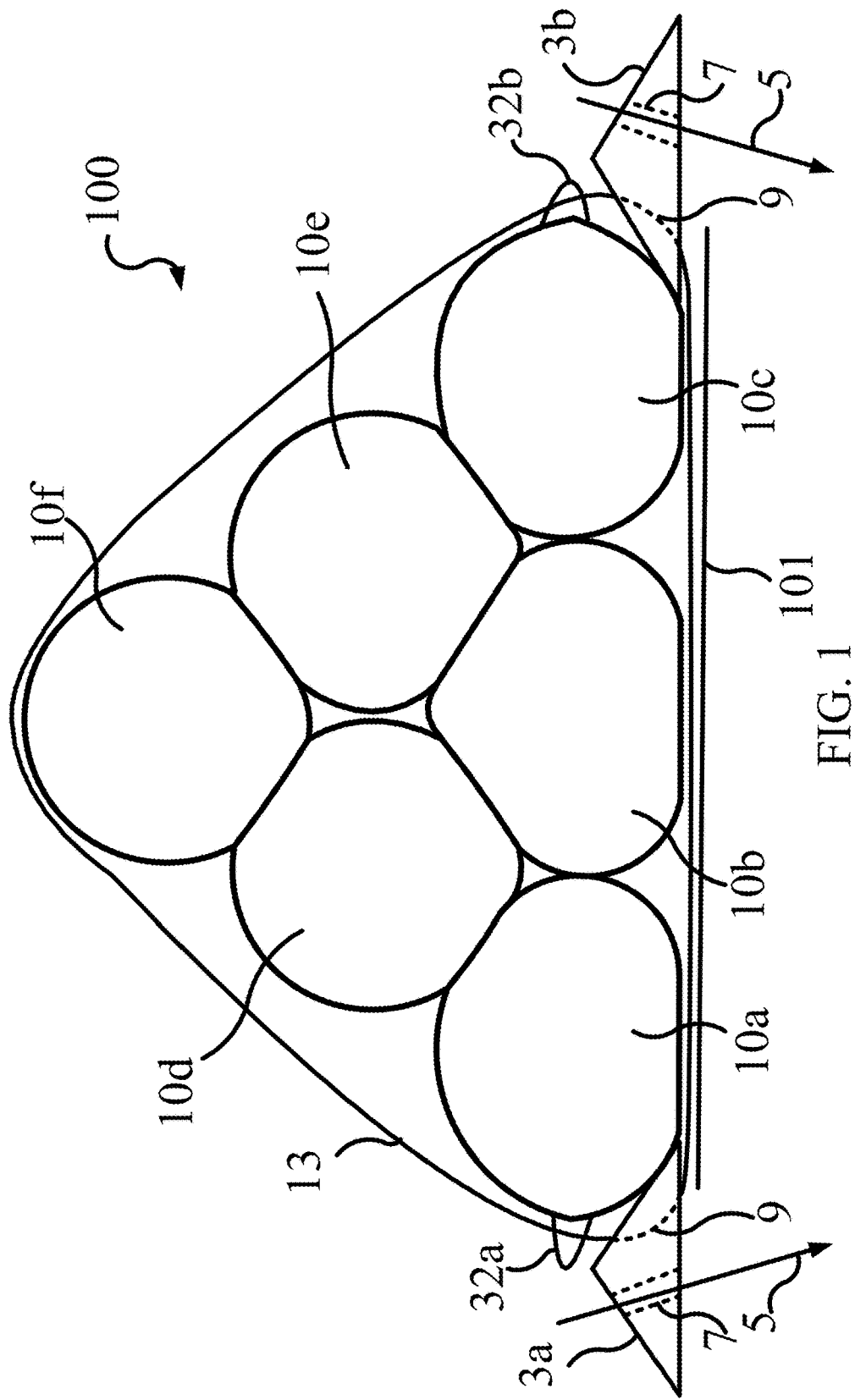
FIG. 1 is a diagram illustrating an earthen anchor for securing a diversion dike according to an example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Historically, sand bags were constructed on-site (or off-site and delivered) for hand-building barriers for temporarily containing or diverting a flow of liquid. This method of barrier construction for fluid containment and diversion is extraordinarily time consuming, requiring large teams of people to construct and/or place the sand bags and additionally large quantities of specific raw material (sand) for the filling of the sand bags. Further, tear-down of the barrier requires equally large teams of people to facilitate the removal of the raw material from the barrier site.

In other areas of fluid containment, large earthen or other man-made containment ponds were constructed by digging out a large section of leveled acreage or constructing earthen barriers thereon, and often utilizing a pad (e.g., of poured concrete), to receive and transfer fluids. The majority of leveled acreage for the pad supports fluid storage, the excavation of which (or movement of materials for the pad) requires a significant amount of man and machine hours. In addition, the construction of pads with concrete requires a vast amount of materials and transport thereof to the construction site. Moreover, the concrete itself must be allowed to cure (dry) prior to use in fluid containment. Example containment pond structures created on a pad include dug-out sections for the pad and/or above ground ponds constructed on the level surface.

The shortcomings of the above fluid containment techniques extend beyond cost and man-hours to implement. For example, sand bag containment structures, while relatively simple to construct, are most effective for temporary diversion, not containment. Thus, in terms of mitigating flood damage, a sand bag barrier may prevent a structure (e.g., a house) from washing out through the diversion of flowing water, but are not sufficient enough to prevent standing water intrusion. As for more permanent structures that are more effective than sand bags, their use in mitigating flood damage in a manner similar to sand bags immediately prior to a possible flood event is often not feasible.

Large flexible containment tubes mitigate the reliance on specific raw materials, reduce installation cost, and decrease the number of personnel required to construct a barrier of a given length and height for fluid diversion and containment. For example, one large containment tube (or tube) may take the place of tens, or hundreds of sand bags, for constructing sections of a barrier during a flood for fluid diversion and containment of floodwaters. In another example, one large tube may take the place of a more permanent structure for fluid containment. In addition, example structure supported containment dikes utilizing flexible containment tubes provide additional configurations for mitigating flood damage, and specifically to mitigate standing water intrusion into enclosed areas along with flood water diversion in applications where sandbags are often utilized. Further, filling of the tube may be carried out through the use of any liquid substance, such as water, wet concrete, other fluid, or even an expanding and hardening foam (such as polyurethane foam) or gas in certain configurations, which may be pumped into the tube.

The substance for filling the tubes can depend on application, for example, water may be used in the case of temporary barriers constructed for diverting flood waters. In another example, concrete may be used in the case of a more permanent barrier for fluid containment—in which case the concrete, once dry, forms a barrier in place of a body of the tube itself.

In one implementation, multiple flexible containment tubes may form a section of a dike for flood diversion. For example, multiple vinyl-coated polyester tubes with a 19-inch diameter may be filled with water and stacked on top of each other to create a temporary diversion dike. Multiple sections of dike may be abutted together to form longer sections of dike. These temporary sections can be erected by stacking multiple tubes in a pyramid fashion and filling each flexible containment tube with water from the approaching flood or water from local hydrants (or other means). The containment tubes may be secured together with polyester strapping, and fastened to the ground with anchors, such as a screw-type anchor (ground stake). Additionally, a vapor barrier or plastic membrane may wrap over dike sections and/or weaved through the flexible containment tubes as they are placed prior to filling to create a seepage barrier (e.g., within the dike section and between abutting dike sections) and reinforce the dike sections. Further, ground sheet weights and/or additional ground anchors may secure a portion of the vapor barrier extending into the containment area.

In other example configurations, a supporting structure for a flexible containment tube may be utilized to construct a section of structure supported containment dike of shorter length than the flexible containment tube. For example, the flexible containment tube may have a closed end, and an open end through which the supporting structure can be inserted into the flexible containment tube to create a structure supported containment dike. As the supporting structure is inserted into the flexible containment tube, a length of the perimeter around the cross section of the supporting structure is preferably less than the circumference of the containment tube to allow for ease of insertion (e.g., without having to stretch the flexible containment tube around the supporting structure). In other example embodiments, the flexible containment tube may be open at both ends, and thus the supporting structure may be inserted into the flexible containment tube from either end. For a given length of flexible containment tube sealed at one end, the supporting structure may extend up to the length of the flexible containment tube less a minimum fold length, where the minimum fold length defines the excess length of tube at an open end that extends past the supporting structure to allow for sealing of the open end. In a tube configuration where the flexible containment tube has two open ends, the structure may extend up to the length of the flexible containment tube less the minimum fold length where the minimum fold length is twice that of a single open end flexible containment tube to allow for sealing at both ends.

In various embodiments, the supporting structure may be constructed to a given length or adjusted to a given length within an adjustment range. For example, considering a doorway or other entryway susceptible to water intrusion, the supporting structure may be adjusted to or constructed with a length to fit within the width of the entrance. For a larger entrance, such as a garage entrance that has a width greater than the length of a given support structure, multiple support structures may be used within a single tube. For example, two structures may be linked together or abutted end to end within a single tube. If the width of the entrance is greater than the length of a flexible containment tube (less the minimum fold length), multiple structures may be used in conjunction with multiple flexible containment tubes. Regardless of the situation, a number of structures and/or tubes may be used to construct section(s) of structure supported containment dike with a particular length.

The height and width of a section of structure supported containment dike depend largely on the dimensions of the supporting structures and the diameter of the flexible containment tubes utilized. As mentioned previously, because the supporting structure is inserted into the flexible containment tube, the length of the perimeter around the cross section of the supporting structure is preferably less than the circumference of the containment tube to allow for ease of insertion. For an example tube with a 12" diameter, the tube has a circumference of approximately 37.7" and can accommodate a variety of supporting structures falling within this dimension. Examples include supporting structures having example cross sections such as a 9×9 square which has a perimeter length of 36" (9+9+9+9), a 6×12 rectangle which has a perimeter length of 36" (6+6+12+12), a 9-12-15 triangle which has a perimeter length of 36", and others. The specific example structures above each have an example perimeter (36") around their cross section that is slightly less than the circumference (37.7") of the flexible containment tube to facilitate ease of insertion. The utilization of a particular structure may be preferred for a given application. For example, a rectangular structure may be preferred to provide additional height to a section of dike placed within an entryway, a square structure for ease of stacking multiple dike sections on top of each other, and a triangular structure to provide additional height and/or stability depending on the orientation and dimensions of the triangle.

Example Fluid Containment Tubes and Related Structures

FIG. 1 is a diagram illustrating an earthen anchor for securing a diversion dike according to an example embodiment. As shown, a section of diversion dike 100 includes a number of flexible containment tubes 10 stacked in a pyramid shape. Namely, for a pyramid type shape, a base layer includes a number of tubes, and the number of tubes decreases as additional layers are added. As shown, the illustrated section of diversion dike 100 in a 3-2-1 pyramid configuration having a base layer (e.g., first layer) of three tubes 10a, 10b, 10c, which decreases by one for each subsequent layer (e.g., tubes 10d, 10e in the second layer and tube 10f in the top layer). Other configurations may include additional or fewer base tubes in the first layer, and may have top layers including more than one tube. For example, a 4-3-2-1, 5-4-3, 5-3-2-1 etc. pyramid configurations may be realized.

In one embodiment, the tubes 10 are flexible fluid containment structures placed in a desired configuration such as singularly or in a pyramid shaped dike section 100 as illustrated in FIG. 1. Tubes 10 may be placed end-to-end to construct diversion dikes longer than the tube body itself. In some embodiments, dike sections 100 may be arranged to form a corral or enclosed area (e.g., a square, circle, rectangle, or other shape), either to hold in fluid for containment or divert fluids. In such instances, the position of tube ends may be staggered. Thus, for example, the ends of the tubes 10 illustrated in FIG. 1 may not be coplanar, but staggered when additional diversion dike sections are abutted together to create longer barriers or angles between one dike section and another.

An example flexible containment tube 10, when filled, may be approximately 100 feet long, with a diameter from 1 foot to exceeding 3 feet and have a volume in excess of 750,000 gallons. Accordingly, tube weight may range from approximately 3 tons to much greater based on dimensions and the material utilized to fill them (e.g., water versus concrete or significantly lighter when utilizing a gas). Prior to filling, the tube may be rolled up along its length for compact storage and transportation. Due to their flexible nature, the length of each containment tube 10 may be positioned when empty to take on be nearly any shape, e.g., a square, a "7", an arc, etc. to construct the barriers around structures and avoid obstacles. For example, in areas where trees, other obstacles or land boundaries need to be accounted for, the tubes 10 may be easily positioned around the trees or other obstacles when empty and then filled.

The tubes 10 themselves are configured to store fluid such as water or gas (e.g., air), concrete or other substance, which may be readily available on-site. Valves may be disposed in the flexible body of the flexible containment tube to receive fluid from a coupling to a filling apparatus facilitating the flow of fluid into the tube via one or more valves. A valve may further be configured to prevent undesired release of the fluid. Hence, once placed around obstacles in a desired configuration, one or more tubes may be filled via a fluid filling apparatus coupled to the valve. Example fluid filling apparatuses may include a pump or hose or pipe, which may be supplied with fluid by a pump or gravity, and in the case of gas, a pressurized canister or compressor. In practice, for example, once a base layer of tubes 10a-c are placed, they may be filled via filling apparatus such as a hose and pump coupled to values disposed in the respective tubes, and additional tubes (e.g., tubes 10d-f, or abutting tubes (not shown)) may be placed and subsequently filled via the filling apparatus as desired to provide on-demand fluid containment or diversion.

A tube 10 or number of tubes (e.g., those in a pyramid configuration) may be secured in a variety of fashions, several of which are illustrated by example for diversion dike section 100. According to one embodiment, a tube 10 may include one or more strap loops 32 coupled to the flexible body of the tube. The strap loops 32 have a diameter great enough to accommodate a strap 13 of a given with. For example, a given strap loop 32 may have a 2.75 in diameter to accommodate a strap 13 with up to a 2.5 in width, a 3.25 in diameter to accommodate a strap 13 up to a 3 in width and so forth. Strap loops 32 coupled to the flexible body of a tube 10 aid in preventing, with the use of a corresponding strap 13, the shifting of tubes along their length, and further aid in maintaining the position of tubes in their desired configuration for the dike section 100. While only two strap loops 32a, 32b are illustrated, one for each of tubes 10a and 10c, respectively, tubes 10a and 10c may include additional strap loops 32 positioned around and down their flexible bodies as desired. Further, the other tubes may include strap loops (not shown) to accommodate a strap 13 proximate to the flexible body. For example, one or more of tubes 10b, 10d, 10f, and 10e may include strap loops coupled to their flexible bodies such that strap 13 may be inserted through the strap loops to maintain the position of the tubes. In larger pyramid formations, e.g., 4-3-2-1, with interior tubes 10 not proximate to a given strap 13 wrapped around the exterior of the dike section, a strap may be interweaved between the tubes and/or addition straps may be utilized. For example, a first strap may be utilized to wrap around a the exterior of a 4-3-2-1 dike section and a second strap utilized to wrap around the 3-2-1 portion, which may further be inserted through strap loops coupled to tubes making up the 4 tube base layer.

As shown, strap 13 is routed through the strap loops 32a, 32b of tubes 10a and 10c, respectively, and around the dike section 100 to secure the tubes 10 of the dike section together. Although not shown, the strap 13 may be routed through any additional number of strap loops (also not shown) of the other tubes. While, as described above, the strap loops 32 and strap 13 aid in preventing the shifting of tube along their length and maintain the tubes in their desired configuration for the dike section 100, they do not prevent the shifting of the entire dike section 100 with respect to the ground 101.

In an embodiment, earthen anchors 3 secured to the ground 101 aid in preventing the shifting of an individual tube or dike section 100 with respect to the ground 101. As shown, an earthen anchor (e.g., 3a and 3b) may be placed adjacent to the body of a tube (e.g., 10a and 10c) at the edges of the base level along its length. Example earthen anchor 3a includes a ground securing mechanism, such as a stake 5 and stake driving portion 7. For example, the driving portion 7 may be an opening in the earthen anchor 3a to receive the stake 5. The configuration of the stake 5 and the driving portion 7 may be such that the driving portion may receive the tip and shaft of the stake driven into the ground 101, but not the other end of the stake. In this way, once the stake 5 is sufficiently driven into the ground 101 through the driving portion 7, the anchor 3a may not be removed from the stake 5. In other words, once the stake 5 is driven into the ground 101 through the stake driving portion 7, the earthen anchor 3a remains secure to the ground 101 until the stake 5 is removed from the ground 101.

Embodiments of a stake 5 may differ based on the composition of the ground 101. For example, a stake 5 for a concrete ground surface may differ from a stake for soil, clay, sand, etc. Further, different lengths of stakes 5 may be chosen to reach a certain depth in the ground 101 based on the ground type. For example, a stake 5 for concrete may be of a shorter length than a stake for soil, however, they may provide similar resistance to removal. The stake 5 may be configured with a helical ridge beginning at the tip driven into the ground 101 and extending up the shaft towards the opposite end, similar to that of a screw, such that rotation of the stake in one direction drives the tip of the stake further into the ground 101 and rotation of the stake in the opposite direction backs the stake out of the ground.

An earthen anchor 3 may include a strap loop 9 disposed in the earthen anchor, which the strap 13 around the tubes 10 may be routed through or otherwise attached to (e.g., at an end of the strap). A strap loop 9 may be configured with a diameter similar to strap loop (e.g., 32a) to receive the strap 13. Inclusion of the strap loop 9 secures the earthen anchor 3 against the adjacent tube 10 and the tube against the anchor. For example, as shown, strap 13 is routed through the strap loop 9 of earthen anchor 3a to secure the earthen anchor 3a against the body of tube 10a. In some embodiments, only stakes 5 may be used, in which case the top ends of the stakes 5 include a strap loop to receive the strap 13. An example strap loop at the top end of a stake 5 may be a metal eye, or hook having a sufficient diameter or opening to receive the strap 13 itself.

One or more additional earthen anchors (not shown) may be placed along the length of the body of the tube 10a as desired. Additionally, as shown, earthen anchors 3a, 3b, may be placed on each side of a dike section 100 (or, in other embodiments, an individual tube) along its length. Earthen anchor 3b may be configured in a fashion similar to that of earthen anchor 3a to secure the anchor 3b against tube 10c and to the ground 101 to prevent shifting of the dike section 100 with respect to the ground.

Figure 9:
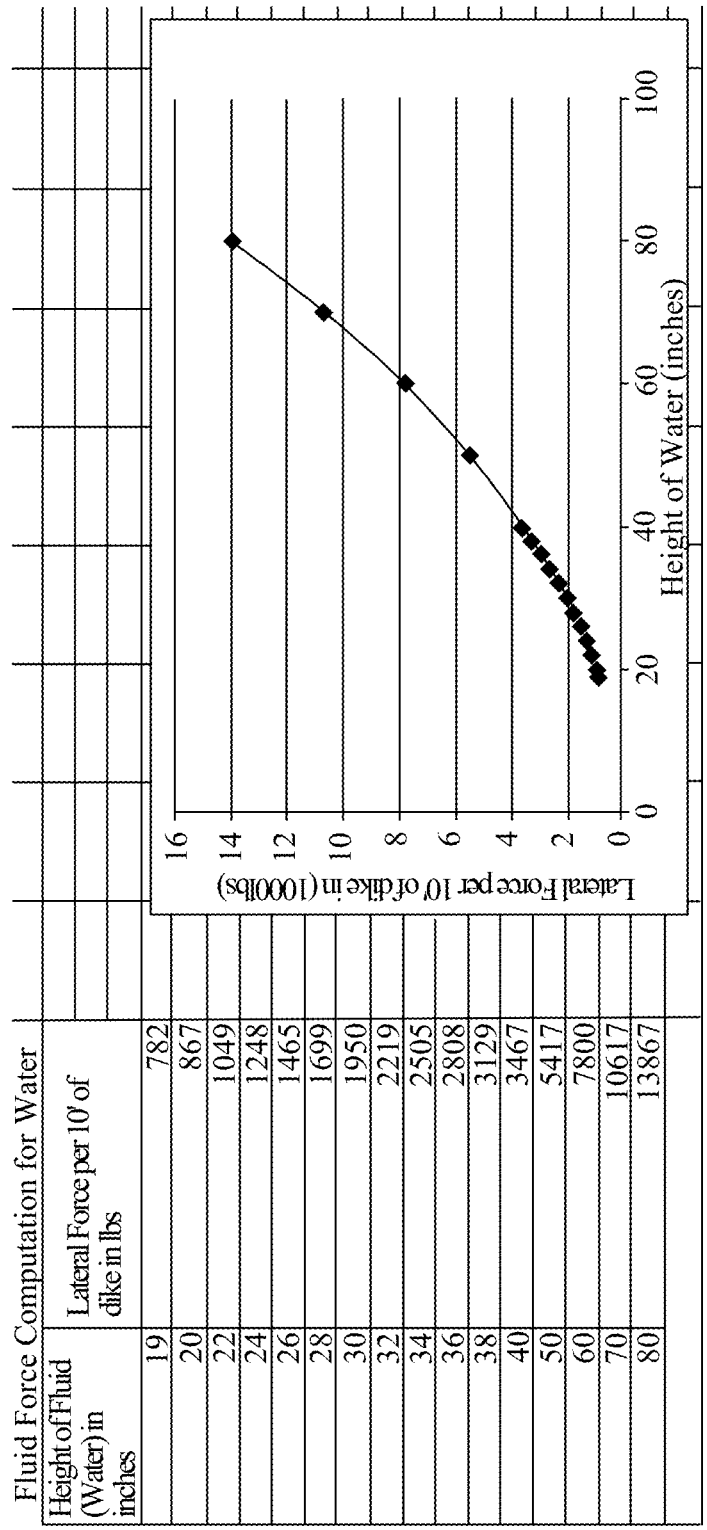
FIG. 9 is a diagram showing the force of hydrostatic pressure increasing with height of a contained fluid.

The number of anchors 3 per length of dike section 100 may depend on the length of the dike section, and the height of the dike section. The higher the dike section 100, the more anchors 3 may be used because the horizontal force of the contained fluid on the dike section increases with depth of the contained fluid. This horizontal force is known as hydrostatic pressure, or Hk, which is characterized by the specific weight of the contained fluid (r) and the square of the depth (h) of the contained fluid. Specifically, $Hk=(r/2)*h^2$ with a line of action of Hk at h/3 above the base of the dike section. The dike section 100 must resist the hydrostatic pressure to remain in place. Referring briefly to FIG. 9, a graph is shown illustrating the exponential growth of force (in 1000 lbs) per 10 feet of dike section 100 due to hydrostatic pressure with increase of height in inches of the contained fluid. In one embodiment, approximately three anchors 3, each with a stake providing 2-10 tons of securing force are utilized per 100 ft length of dike section 100 per tube 10 in a pyramid configuration (as the number of tubes correlates to height of the dike section and thus the possible height of contained fluid). In the above securing scheme, a safety factor may be built in to protect against additional horizontal forces such as wave action that increase the force a dike section 100 must withstand over the hydrostatic pressure alone. For example, if the securing force provided by the number of stakes utilized per dike section is closely matched to the hydrostatic pressure, the weight of the tubes themselves in conjunction with the other strengthening features described herein (e.g., inclusion of a vapor barrier extending into the containment area) may provide a sufficient safety factor.

Figure 2:
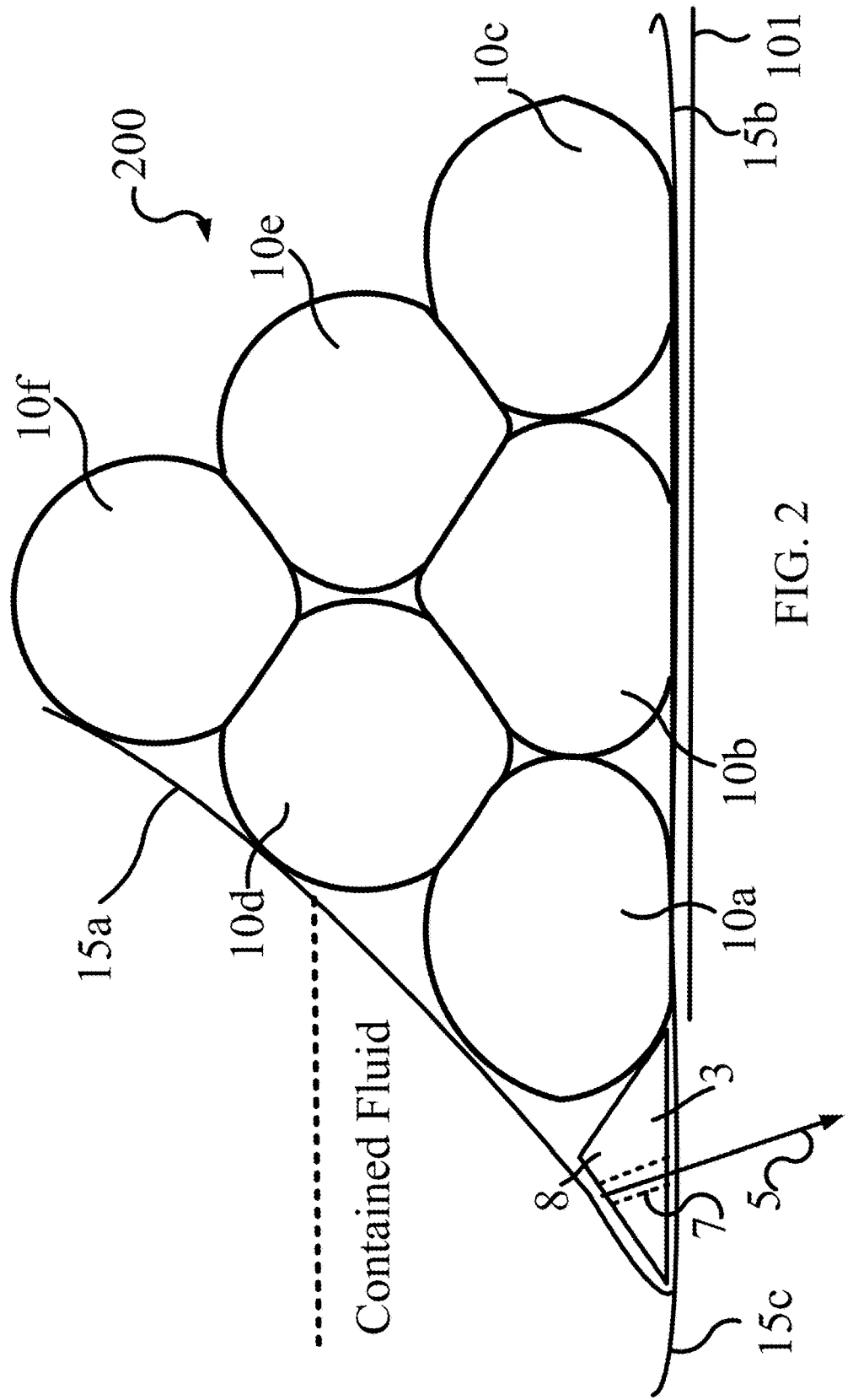
FIG. 2 is a diagram illustrating an earthen anchor for securing a vapor barrier according to an example embodiment.

FIG. 2 is a diagram illustrating an earthen anchor for securing a vapor barrier 15 according to an example embodiment. The earthen anchor 3 shown in FIG. 2 may be of a configuration similar to that of FIG. 1. For example, the earthen anchor 3 may include a strap loop (not shown) for securing the anchor against tube 10a with a strap, which may be wrapped around the dike section 200 or through tubes 10 within the dike section. The tubes 10 themselves of dike section 200 are shown with a configuration similar to that of FIG. 1.

Over the embodiment of FIG. 1, the dike section 200 illustrated in FIG. 2 includes a vapor barrier 15 to provide additional resistance against the intrusion of fluid through the dike section 200. In one embodiment, the vapor barrier 15 is a watertight material, such as poly visqueen or other material that prevents intrusion of fluid through its surface. In an embodiment, the poly visqueen is between 5-15 millimeters in thickness. In some embodiments, the poly visqueen is reinforced, for example, with an embedded webbing material such as nylon strands (e.g., string).

The vapor barrier 15 may wrap over, underneath, and/or through the tubes of a dike section 200 depending on the configuration. Additionally, the vapor barrier 15 may extend along a portion or entire length of the dike section 200, and may include multiple overlapping sections to extend over the entire length or portion of the dike section. In one embodiment, the vapor barrier 15 extends over a length of the dike section 200 where tube ends are abutted against each other (e.g., at a junction of two dike sections 200) to create longer dike sections than the tubes 10 themselves. The junction of two dike sections 200 may be in a line, at an angle, or other configuration. In the case of a pyramid dike section 200, one or more tubes may be staggered to facilitate a bend (e.g., tubes 10b, 10c, 10e on the interior of the barrier may be staggered back from tubes 10a, 10d, 10f for a right bend). Similarly, corresponding tubes of an additional dike section may be configured (e.g., staggered) such that they abut to the tubes 10 of dike section 200 to form a junction that bends to the right.

A vapor barrier 15 configuration may include a portion that extends from under the rear 15b of the dike section 200 and a portion that extends up the front 15a of the dike section from the front base of the dike section forming part of the containment area. In the illustrated configuration, the vapor barrier 15 extends under the earthen anchor 3, which secures the vapor barrier 15 to the ground 101 through the driving of stake 5 into the ground 101 through the vapor barrier. Further, the vapor barrier 15 may be folded at the rear portion 15b such that a front portion 15a may extend up the front face of the dike section 200 from the front base of the dike section and an additional portion 15c may extend from the front base of the dike section along the ground 101 into the fluid containment area. The additional portion 15c may extend 1-3 yards or longer from the front base of the dike section 200 within the containment area to mitigate erosion of the ground 101 under the dike section 200 by the contained fluid. The additional portion 15c may be secured at the extended end to the ground 101 with additional earthen anchors and/or with weights (not shown).

The earthen anchor 3 may be configured with a slopped face 8 to provide a gradual incline leading up to the body of the adjacent tube 10a for the portion 15a of the vapor barrier to lie on as it extends up the front face of the dike section 200 from the front base forming the containment area. Additionally, the driving portion 7 of the earthen anchor 3 may be configured such that the driving end of the stake 5 does not extend past the slopped face 8 of the earthen anchor 3. In such a way, tearing or puncture of the portion 15a of the vapor barrier leading up the front face of the dike section 200 within the containment area may be mitigated.

Figure 3A:
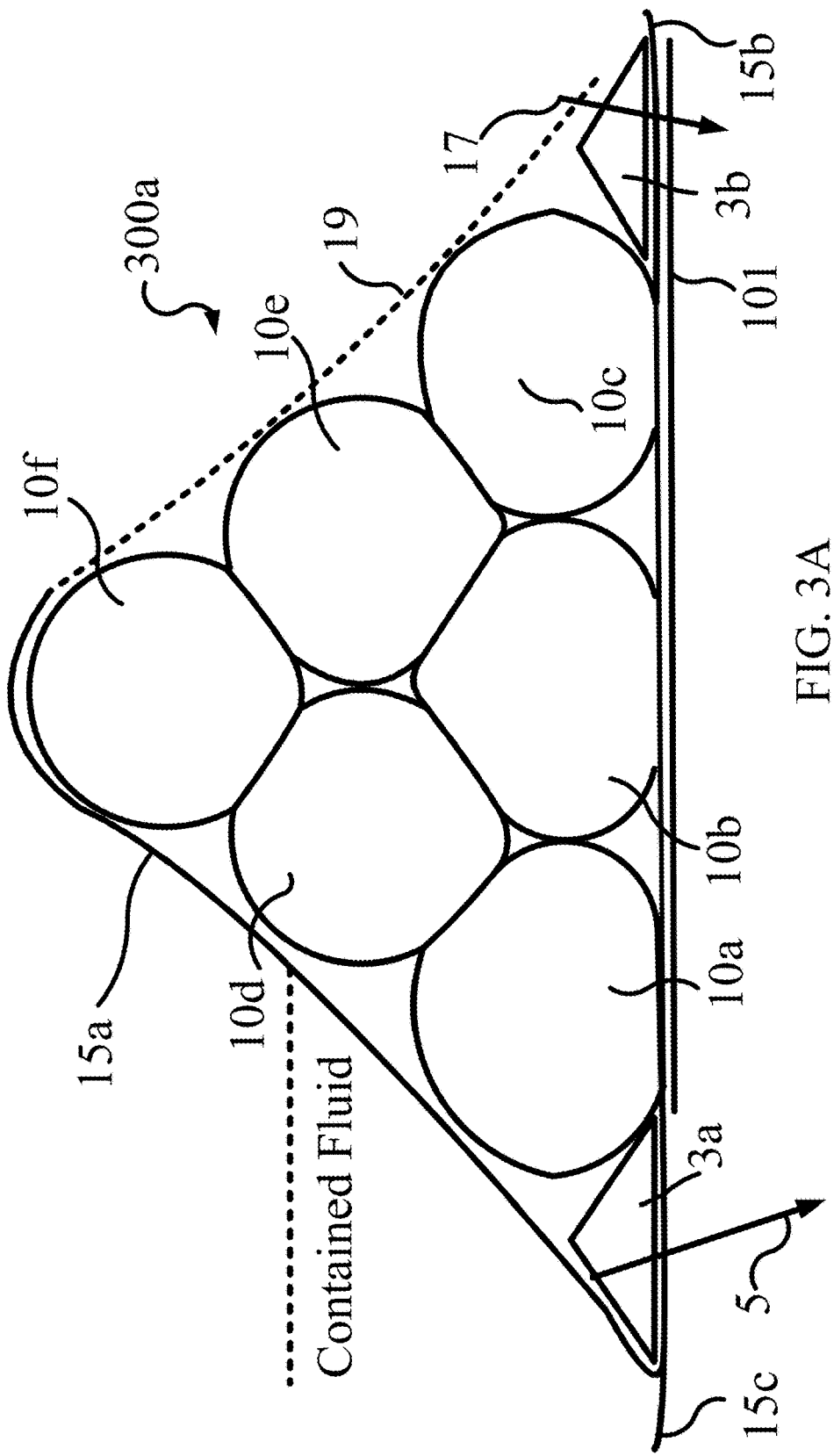
FIG. 3A is a diagram illustrating a vapor barrier configuration in constructing a diversion dike according to an example embodiment.

FIG. 3A is a diagram illustrating a vapor barrier 15 configuration in constructing a diversion dike according to an example embodiment. The earthen anchors 3a, 3b shown in FIG. 3A may be of a configuration similar to that of FIG. 1. For example, the earthen anchors 3a, 3b may include a strap loop (not shown) for securing the anchor against tubes 10a, 10c, respectively, with a strap, which may be wrapped around the dike section 300a or through tubes 10 within the dike section. The tubes 10 themselves of dike section 300a are shown with a configuration similar to that of FIG. 1.

Over the embodiment of FIG. 1, the dike section 300a illustrated in FIG. 3A includes a vapor barrier 15 to provide additional resistance against the intrusion of fluid through the dike section 300a. In one embodiment, the vapor barrier 15 is a watertight material, such as poly visqueen or other material that prevents intrusion of fluid through its surface. In an embodiment, the poly visqueen is between 5-15 millimeters in thickness. In some embodiments, the poly visqueen is reinforced, for example, with an embedded webbing material such as nylon strands (e.g., string).

The vapor barrier 15 may wrap over, underneath, and/or through the tubes of a dike section 300a depending on the configuration. Additionally, the vapor barrier 15 may extend along a portion or entire length of the dike section 300a, and may include multiple overlapping sections to extend over the entire length or portion of the dike section. In one embodiment, the vapor barrier 15 extends over a length of the dike section 300a where tube ends are abutted against each other (e.g., at a junction of two dike sections 300a) to create longer dike sections than the tubes 10 themselves. The junction of two dike sections 300a may be in a line, at an angle, or other configuration. In the case of a pyramid dike section 300a, one or more tubes may be staggered to facilitate a bend (e.g., tubes 10b, 10c, 10e on the interior of the barrier may be staggered back from tubes 10a, 10d, 10f for a right bend). Similarly, corresponding tubes of an additional dike section may be configured (e.g., staggered) such that they abut to the tubes 10 of dike section 300a to form a junction that bends to the right.

A vapor barrier 15 configuration may include a portion that extends from under the rear 15b of the dike section 300a and up the front 15a of the dike section from the front base of the dike section forming part of the containment area. As shown in the illustrated configuration, the vapor barrier 15 extends under the earthen anchor 3a, which secures the vapor barrier 15 to the ground 101 through the driving of stake 5 into the ground 101 through the vapor barrier 15. Further, the vapor barrier 15 may be folded at the rear portion 15b such that a front portion 15a may extend up the front face of the dike section 300a from the front base of the dike section and an additional portion 15c may extend from the front base of the dike section along the ground 101 into the fluid containment area. The additional portion 15c may extend 1-3 yards or longer from the front base of the dike section 300a within the containment area to mitigate erosion of the ground 101 under the dike section 300a by the contained fluid. The additional portion 15c may be secured at the extended end to the ground 101 with additional earthen anchors and/or with weights (not shown).

In one embodiment, the earthen anchor 3a is configured with a slopped face to provide a gradual incline leading up to the body of the adjacent tube 10a for the portion 15a of the vapor barrier 15 to lie on as it extends up the front face of the dike section 300a from the front base forming the containment area. Further, in some embodiments a driving portion (not shown) of the earthen anchor 3a through which the stake 5 is driven is configured such that the driving end of the stake 5 does not extend past the slopped face of the earthen anchor. In such a way, tearing or puncture of the vapor barrier portion 15a leading up the front face of the dike section 300a within the containment area may be mitigated.

In the embodiment illustrated in FIG. 3A, a second earthen anchor 3b secured to the ground 101 via the driving of stake 17 further secures the rear end of portion 15b of the vapor barrier 15 to the ground 101, e.g., through the positioning of the rear end of portion 15b of the vapor barrier 15b under the earthen anchor 15b at the rear base of the dike section 300a and the driving of stake 17 through the rear end of portion 15b of the vapor into the ground. Additionally, the vapor barrier portion 15a extending up the front face of the dike section 300a from the front base of the dike section is secured over the top of the dike section 300a to the earthen anchor 3b, e.g., via a connecting strap 19 to stake 17 or to a strap loop (not shown) of the earthen anchor 3b. In some embodiments, the front portion 15a of the vapor barrier 15 may be of sufficient length to extend over the top of the dike section 300a and to the rear base of the dike section to be secured to or via the earthen anchor 3b without the aid of a connecting strap 19. In either instance, the vapor barrier 15 is secured to the ground 101 via earthen anchors, stakes and/or straps.

Securing the vapor barrier 15 to the ground 101 on both sides of a dike section 300a of one or more tubes 10 provides some unexpected benefits. The tubes 10 themselves may also be secured to the ground 101 (e.g., as explained with reference to FIG. 1). Thus, for example, in instances where the vapor barrier 15 is impervious to fluid, such as in the case of a vapor barrier constructed of poly visqueen, the tubes 10 need only provide shape to dike section 300a as the portion of vapor barrier 15a extending up the front face of the dike section from the front base within the containment area substantially prevents fluid transfer through the dike section. Accordingly, in such a configuration as that illustrated in FIG. 3A, the tubes 10 may be filled with a substance of substantially different density than the fluid being contained. For example, when considering containment of a fluid such as water, the tubes 10 may be filled with air or other gas. As the contained fluid rises against the front portion 15a of the vapor barrier, the pressure of the fluid increases with depth to compress the front portion of the vapor barrier below the surface of the contained fluid against the body of tube 10a, then tube 10d, and so on. Due to the pyramid shape of the dike section 300a and front portion 15a of the impervious vapor barrier being pressed against the tubes along the front face of the dike section within the containment area, as the depth of the contained fluid increases, a column of contained fluid develops over portions of the tubes on the lower levels of the front face of the dike section below the surface of the contained fluid. For example, a column of contained fluid develops over a portion of tube 10a, then 10b, and so on as they fall below the surface of the contained fluid when contained fluid depth increases. The weight of a column of contained fluid over a portion of a tube below the surface of the contained fluid increases with depth of the contained fluid (i.e., because the height of the column increases with depth of the contained fluid). As the front portion 15a of the vapor barrier is impervious to the contained fluid, the weight of the column of fluid developing over a portion of a tube (e.g., 10a) presses down on the tube by way of the vapor barrier. This downward force of the weight of the contained fluid acting on the lower level tubes, e.g., tube 10a, via the front 15a of the vapor barrier acts to aid in preventing shifting of the dike section 300a. For example, the downward force works in concert with the one or more anchors, stakes, and/or straps securing the dike section 300a to prevent the contained fluid from generating a horizontal force sufficient to dislodge the dike section. Further, due to the downward force generated by configuring a dike section 300a in this manner, in some embodiments tubes 10 may be filled with a fluid having a density less than the contained fluid. Specifically, because the tubes along the front face of the dike section 300a within the containment area are pressed downward to the ground 101 (and against lower level tubes) by the contained fluid itself as the surface of the contained fluid rises, mitigation of the intrusion of the contained fluid underneath and/or through the dike section and dike strength are vastly improved such that density of the fluid filling the tubes and/or anchor strength may be reduced. In such a way, while wholly filling the tubes with gas may not be implemented in practice, the amount of fluid utilized in filling the tubes 10 may be substantially reduced through partial filling with, for example, water and partial filling with, for example, air without reducing the effectiveness of the dike section 300a.

FIG. 3B1 and FIG. 3B2 are diagrams illustrating a vapor barrier 15 configuration in constructing a diversion dike according to example embodiments. The stakes 17a and 17b, although not shown, may be driven through an earthen anchor to secure the vapor barrier 15 to the ground 101. In some embodiments, stake 17a and/or stake 17b are not utilized to secure the vapor barrier 15 to the ground 101 because the weight of the tubes 10 holds the vapor barrier to the ground. For example, only front stakes 17a may be implemented to secure the vapor barrier 15 to the ground 101. The tubes 10 themselves of dike section 300b are shown with a configuration similar to that of FIG. 1.

The dike section 300b illustrated in FIG. 3B1 includes a vapor barrier 15 to provide additional resistance against the intrusion of fluid through the dike section 300b and additional strengthening of the dike section 300b. In one embodiment, the vapor barrier 15 is a watertight material, such as poly visqueen, to prevent intrusion of contained fluid through its surface.

The vapor barrier 15 may wrap over, underneath, and/or through the tubes of a dike section 300b depending on the configuration. Additionally, the vapor barrier 15 may extend along a portion or entire length of the dike section 300b, and may include multiple overlapping sections to extend over the entire length or portion of the dike section. In one embodiment, the vapor barrier 15 extends over a length of the dike section 300b where tube ends are abutted against each other (e.g., at a junction of two dike sections 300b) to create longer dike sections than the tubes 10 themselves. The junction of two dike sections 300b may be in a line, at an angle, or other configuration. In the case of a pyramid dike section 300b, one or more tubes may be staggered to facilitate a bend (e.g., tubes 10b, 10c, 10e on the interior of the barrier may be staggered back from tubes 10a, 10d, 10f for a right bend). Similarly, corresponding tubes of an additional dike section may be configured (e.g., staggered) such that they abut to the tubes 10 of dike section 300b to form a junction that bends to the right.

Over the embodiment of FIG. 3A, the vapor barrier 15 in FIG. 3B1 includes a portion 15b that extends from under the front base of the dike section 300b to the rear base of the dike section, a portion 15d that wraps around the rear and over the top of the dike section, and a portion 15a that extends from the top of the dike section down the front face of the dike section 300b to the front base of the dike section with a portion 15c continuing to extend along the ground 101 from the front base of the dike section into the fluid containment area. As shown, the vapor barrier 15 may be secured to the ground 101 by ground stake 17a at the front, and optionally an additional stake 17b at the rear, which may be driven through ground anchors (not shown). The portion 15c of the vapor barrier extending out in front of the dike section 300b may extend 1-3 yards or longer from the front base of the dike section into the containment area to mitigate erosion of the ground 101 under the dike section 300b. The portion 15c of the vapor barrier extending into the containment area may be secured to the ground 101 proximate to the front base of the dike section 300b and at its end. For example, portion 15c of the vapor barrier may be secured proximate to the front face at the front base of the dike section 300b and at the extended end to the ground 101 with additional earthen anchors and stakes (not shown) and/or with weights 31a and 31b, respectively, as shown.

In the illustrated embodiment, the portion 15a of the vapor barrier extending down the front face of the dike section 300b and the portion 15c of the vapor barrier continuing to extend into the containment area from the front base of the dike section provides some unexpected benefits in resisting the hydrostatic pressure of the contained fluid against the dike section 300b. Specifically, with the weight of the column of contained fluid pushing down on portion 15c of the vapor barrier, as well as down on the portion 15a of the vapor barrier extending down the front face of the dike section 300b that is below the surface of the contained fluid, the resulting effect of the downward force of the column of fluid on the vapor barrier is similar to a person standing (e.g., the weight of the fluid) on a board (e.g., the vapor barrier 15) while simultaneously trying to lift the board (e.g., the lateral force due to hydrostatic pressure against the front face of the dike section 300b). Turning briefly to FIG. 10, a diagram is shown to illustrate the downward force of an example contained fluid (water) in pounds per foot length of the dike section on a dike with a 1V (vertical):1H (horizontal) ratio in comparison with the lateral force of the contained fluid in pounds per foot length of dike section. The 1V:1H ratio represents an example dike section having a front face with a 45 degree slope, e.g., approximation of a pyramid shaped dike section where for each foot in vertical dike height, the front base of the dike extends one foot horizontally into the containment area. The downward force generated by a contained fluid due to column height increases along with the horizontal force of hydrostatic pressure as the height of a contained fluid rises. The downward force is characterized by the specific weight of the contained fluid (r), the depth (h) of the contained fluid, and ratio of the dike vertical to horizontal. For the example 1V:1H ratio, the downward force generated by fluid with depth (h) equates to $r/2 \cdot h^2$. Thus, as the hydrostatic pressure acts laterally (e.g., horizontally) against the front face of the dike section 300b, the downward force of the water column on section 15c and the sloped front face 15a of the vapor barrier (and thus on the tubes) aids in resisting dike movement due to the lateral force of the hydrostatic pressure.

Continuing with FIG. 3B1, as shown, the portion 15d of vapor barrier extending up the rear face from the rear base to the top of the dike section 300b may be routed between one or more of the tubes 10 within the interior of the dike section to aid in resisting the pulling action of the downward force of the water column on the portion 15a of vapor barrier extending down the front face of the dike section. FIG. 3B2 illustrates an alternate configuration in which the portion 15d of vapor barrier extending up the rear face is not routed through the interior between one or more of the tubes 10 within the interior of the dike section 300b. In this example, the one or more stakes and/or ground anchors and weight of the tubes 10 on the portion 15b of the vapor barrier extending under the dike section 300b resist the pulling action of the downward force on the portion 15a of vapor barrier extending down the front face of the dike section. The configuration illustrated in FIG. 3B2 may be simpler to implement when the weight of the tubes and/or stakes and anchors provide sufficient strength to resist the putting action.

FIG. 3C1 and FIG. 3C2 are diagrams illustrating a vapor barrier 15 configuration in constructing a diversion dike section according to example embodiments. Specifically, FIG. 3C1 and FIG. 3C2 illustrate additional benefits of diversion dike construction similar to that illustrated in FIGS. 3B1 and 3B2 when the contained fluid seeps under and/or through the portion 15a of vapor barrier at the front face of a dike section and/or the portion 15c of the vapor barrier extending within the containment area.

As shown in FIG. 3C1, a seepage gap 33 may exist between the portion 15b of the vapor barrier extending from the front base of the dike section 300c under tube 10c to the rear base and the portions 15a,15c of the vapor barrier extending down the front face to the front base and into the containment area. As the level 35a of the contained fluid 32 rises within the containment area, contained fluid may seep into the ground 101 beyond the portion 15c of vapor barrier extending into the containment area. In turn, the contained fluid may seep up from the ground 101 through the gap 33 and into the interior 34 of the vapor barrier wrapping the tubes 10. Additionally, the contained fluid may seep into the interior 34 at overlapping sections of vapor barrier 15 along the dike section 300c or via punctures that may occur in the extended portion 15c of the vapor barrier in the containment area and/or portion 15a of the vapor barrier extending down the front face.

As long as the portion 15b of the vapor barrier extending underneath the dike section 300c remains secured and portion 15b and portion 15d of the vapor barrier remain relatively puncture free (i.e., the punctures do not allow escape of fluid faster than the rate of seepage into the interior 34 of the dike section), the seeping fluid is substantially contained within the interior of the dike section by the vapor barrier 15. In turn, a level 35b of the seeping fluid within the interior 34 of the dike section 300c may rise to a level substantially similar to the surface level 35a of the contained fluid.

The seepage of contained fluid 32 from the containment area into the interior 34 of the dike section 300c may at first appear as a failure of the dike section 300c, however, this is not the case when the vapor barrier 15 sufficiently retains the seeping fluid within the interior 34. In fact, some unexpected benefits are gained in such instances. As the level 35b of the fluid within the interior 34 of the dike section 300c rises, it counteracts the hydrostatic pressure on the front face of the dike section due to the level 35a of contained fluid within the containment area. Specifically, while the contained fluid 32 within the containment area generates a lateral force (which can shift the whole dike section) acting on the front face of the dike section 300c, so does the fluid within the interior 34 of the dike section, but in the opposite direction. In fact, when the level 35b of fluid within the interior 34 is substantially equal to the level 35a of contained fluid 32 within the containment area, the lateral force pushing the portion 15a of the vapor barrier away from the front face (e.g., out into the containment area) from within the interior due to the level of fluid within the interior substantially cancels out the lateral force pushing the portion 15a of the vapor barrier into the front face due to the level of fluid within the containment area. Accordingly, when the fluid level 35b within the dike section 300c rises, because the force of the contained fluid 32 on the front face of the dike section is reduced the dike section is less likely to shift.

Although the force against the front face of the dike section 300c due to the hydrostatic pressure of the contained fluid 32 may be mitigated when a fluid level 35b within the interior 34 of the dike section rises, the fluid within the interior generates a lateral force acting outward from the interior of the dike section on the portion 15d of the vapor barrier at the back face of the dike section. For this reason, embodiments of the vapor barrier 15 may include webbing for reinforcement to increase durability. The vapor barrier 15 and securing straps (not shown) around the dike section 300c resist this hydrostatic force due to the level 35b of fluid within the interior. Importantly, the force on portion 15b of the vapor barrier from within the interior 34 of the dike section 300c due to the hydrostatic pressure of the fluid level 35b does not act to shift the dike section. Weaving the vapor barrier 15 around one or more tubes 10 within the interior 34 (e.g., as shown in FIG. 3B1) aids in resisting the hydrostatic force from the interior 34 fluid level 35b and thus may reduce the possibility of the vapor barrier 15 from shifting due to the hydrostatic pressure from the fluid within the interior 34. For example, in embodiments where the vapor barrier 15 routed between one or more of the tubes 10 within the interior of the dike section (e.g., as shown in FIG. 3B1), increasing the level 35b of fluid within the interior 34 of the dike section may cause a column of water to form on top of one or more portions of the vapor barrier (e.g., the portion below tube 10f) within the interior, which provides downward pressure due to the weight of the column of fluid (e.g., similar to the downward force on the front face of the dike section). This downward pressure on the vapor barrier 15 routed within the interior presses the vapor barrier down against lower level tubes which mitigates shifting of the vapor barrier, tubes 10, and the dike section 300c itself when seepage occurs.

As the fluid level 35b within the interior 34 rises, portion 15d of the vapor barrier may bulge out due to the hydrostatic force acting outwards. Additionally, the weight of the column of fluid within the interior 34 exerts a force acting down on the bulged areas and portion 15b of the vapor barrier. The combination of downward force and the bulging act to seal the portions 15d, 15b of the vapor barrier against the ground 101 at the rear face of the dike section 300c, beneficially aiding in preventing fluid from breaching the dike section. FIG. 3C2 illustrates the above principles in practice.

FIG. 3C2 illustrates a 2-1 pyramid dike section 300d constructed according to the principles described in connection with FIG. 3C1. As shown, the dike section 300d contains a fluid 32 within the containment area and a vapor barrier 15 wrapped around the dike section. The vapor barrier 15 includes a portion 15b extending from the front of the dike section 300d underneath tube 10x and then underneath tube 10y to the rear of the dike section 300d. Portion 15b of the vapor barrier continues to portion 15d of the vapor barrier, which wraps around tube 10y at the rear of the dike section 300d to tube 10z at the top of the dike section and continues to portion 15a of the vapor barrier. Portion 15a of the vapor barrier extends from the top to the dike section 300d down the front face, and may include an extend portion (now shown) that extends along the ground 101 into the containment area.

Stake 17a secures anchor 3a to the ground 101 with strap 13a coupled to the anchor and wrapping around the tubes to secure the dike section 300d to the ground at the rear. The strap 13a may wrap around the vapor barrier 15 and tubes 10 from the rear of the dike section 300d to an anchor and/or stake (not shown) at the front of the dike section in order to additionally secure the dike section to the ground. Additional anchors, stakes, and straps may be implemented along the length of rear of the dike section 300d at a given interval along will corresponding anchors and stakes at the front of the dike section (not shown). For example, anchor 3b, stake 17b, and strap 13b may secure the dike section 300d at an interval 10 feet or greater from anchor 3a. Anchor 3c, stake 17c, and strap 13c may secure the dike section 300d at the same interval, e.g., 10 feet. Thus, in the present example, securing a 30+ foot length of dike section 300d to contain fluid 32 within the containment area. The interval at which anchors, stakes, and straps are positioned may vary based on the height of the dike section 300d, composition of the ground, and whether the contained fluid may produce waves acting on the dike section.

As shown, fluid 32 from the containment area has seeped into the interior 34 of the dike section 300d to level 35b, which may be substantially similar to the level 35a of fluid in the containment area. Accordingly, the portion 15d of the vapor barrier at the rear of the dike section 300d bulges 37 out due to the force of the hydrostatic pressure of the level 35b of fluid within the interior 34 acting outwards from within the interior 34 of the dike section 300d. Downward force due to the column of fluid within the interior 34 presses the bottom of bulges 37 in portion 15d of the vapor barrier against the ground 101, which aids in mitigating seepage of fluid through and underneath the rear of the dike section 300d from both the interior 34 of the dike section and the containment area.

Figure 4A:
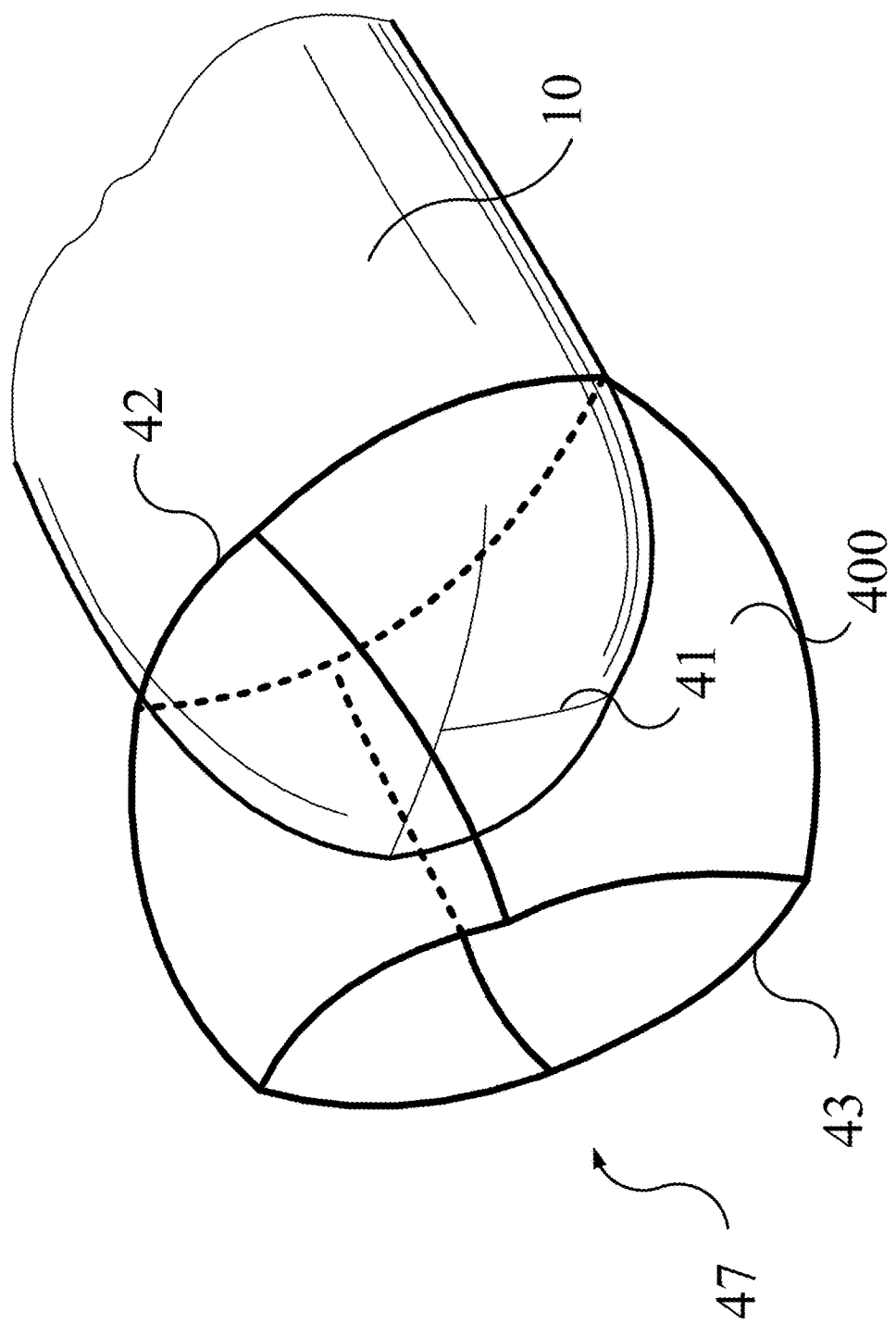
FIG. 4A, FIG. 4B, FIG. 4C are diagrams illustrating an integrated vapor barrier of a flexible containment tube according to example embodiments.
Figure 4B:
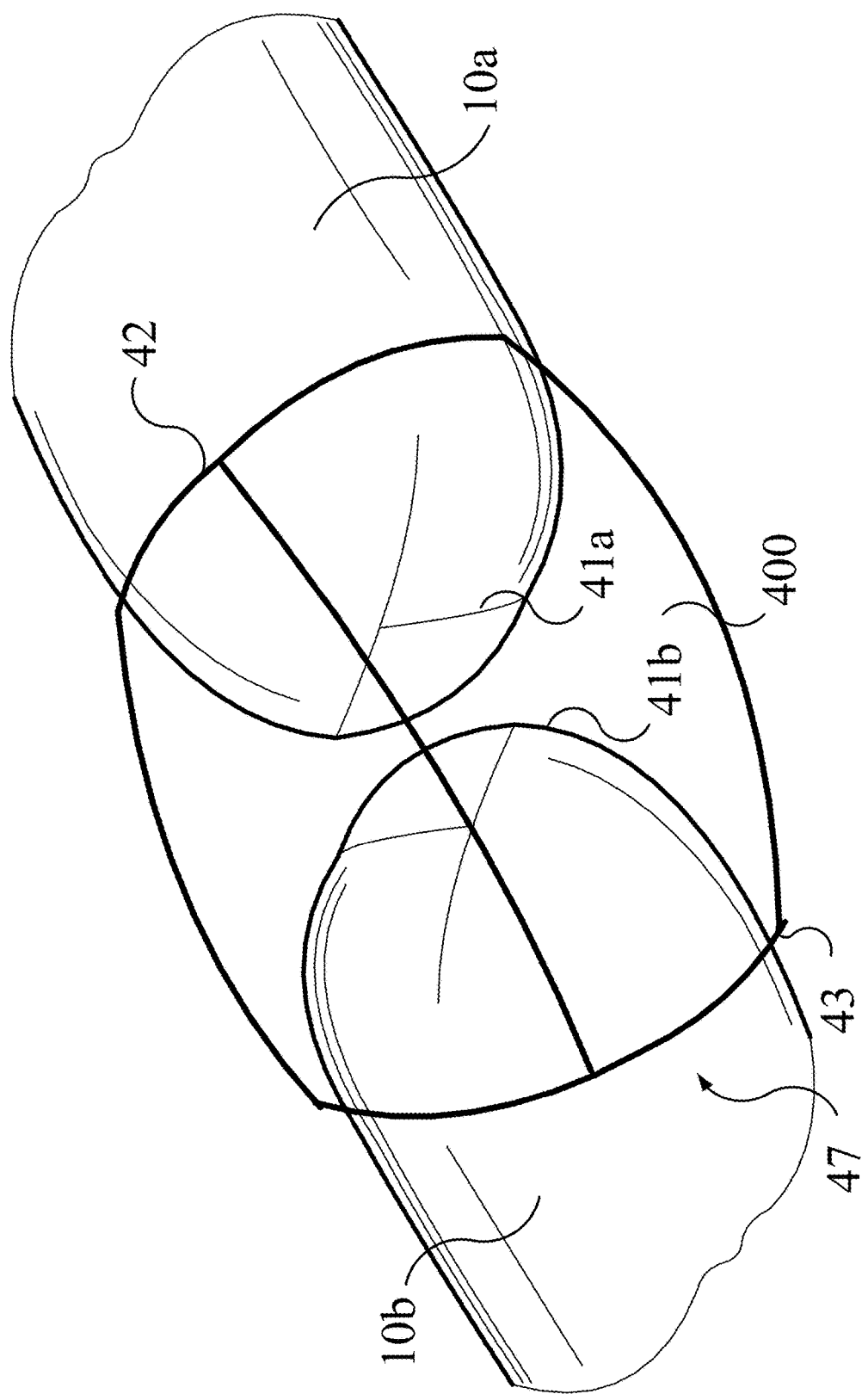
Figure 4C:
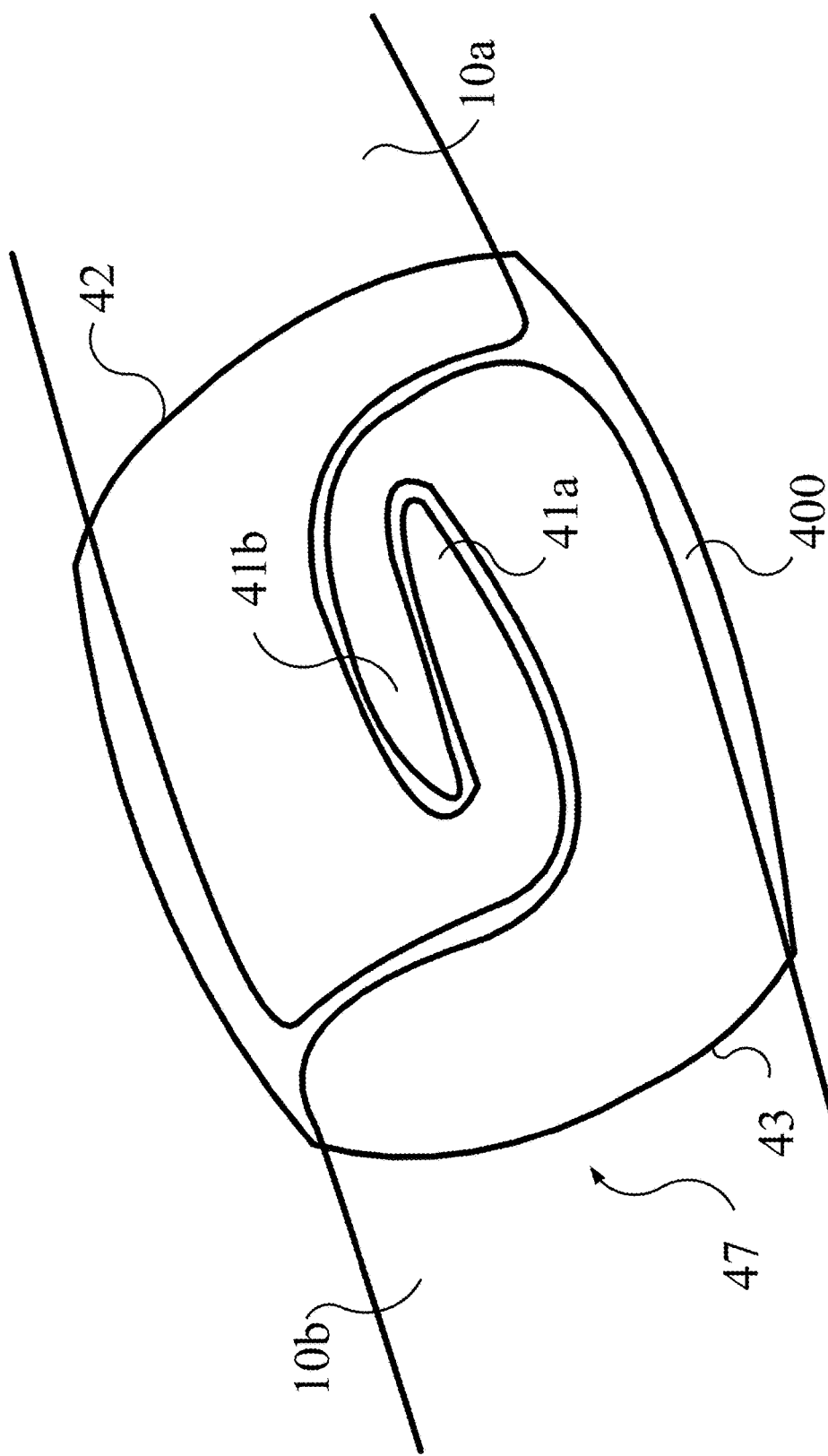

FIG. 4A, FIG. 4B, and FIG. 4C are diagrams illustrating an integrated vapor barrier 400 of a flexible containment tube 10 according to example embodiments. As shown in FIG. 4A, a tube 10 comprises an integrated vapor barrier 400 disposed proximate to an end 41 of is flexible body. Straps, anchors, and/or additional vapor barrier as described previously may work in conjunction with the integrated vapor barriers to hold abutting tubes together to form dike sections from abutted tubes of any length.

The integrated vapor barrier 400 may be attached to the body of the tube 10. For example, end 42 of the integrated vapor barrier 400 may be attached to the body of the tube 10 via a heat mold or other affixing means. In some embodiments, the integrated vapor barrier 400 is a sleeve that extends a distance over the end 41 of the tube 10. In one embodiment, the distance the integrated vapor barrier 400 extends over the end 41 of the tube 10 is sufficient for the end 42 of the integrated vapor barrier to engage the body of the tube 10. In turn, when the tube 10 is filled, the body of the tube expands and is affixed with the end 42 of the integrated vapor barrier 400 via compressing the body of the expanding tube at the end 42. In such cases, end 42 of integrated vapor barrier 400 may be of a diameter less than the diameter of the body of a filled tube 10 to attach via compression. In either instance, with one end 42 of the integrated vapor barrier 400 attached to the tube 10, the opposite end 43 includes an opening 47 and extends a distance past the end 41 of the tube 10 to receive an additional tube.

In one embodiment, the distance the opposite end 43 extends past the end 41 of the tube 10 is sufficient to engage the body of the additional tube, which when filled forms an attachment with the opposite end 43 via compression. Thus, for example, the opposite end 43 of the vapor barrier 400 may be configured similar to end 42 in a sleeve configuration. As an example, the sleeve may span 1-3 feet of the body of the tube 10, and include 1-3 feet of remaining length from the opening 47 to engage the body of another tube inserted in the opening 47. Thus, the integrated vapor barrier 400 may have an overall length of approximately 2-6 feet.

In one embodiment, the integrated vapor barrier 400 is constructed of a watertight material, such as poly visqueen, rubber, etc. or other material similar to that used to construct the tube 10 or vapor barrier 15, to prevent intrusion of fluid through its surface. Thus, for example, when an additional tube is inserted into the opening 47 as illustrated in FIG. 4B, fluid intrusion between abutting tube ends 41a, 41b may be mitigated. Inclusion of straps, loops and/or anchors, such as those shown in FIG. 1, that prevent shifting of tubes with respect to ground, aid in maintaining engagement of the tubes within the integrated vapor barrier 400 such that a seamless dike may be constructed in any length from multiple dike sections. Additionally, vapor barriers, such as those explained with reference to FIGS. 2-3, may be utilized to wrap pyramid dike sections and especially the junction of two dike sections having abutting tubes attached via integrated vapor barriers 400 to further mitigate fluid seepage through the dike.

As shown in FIG. 4B, a tube 10a comprises an integrated vapor barrier 400 disposed proximate to the end 41a of is flexible body. The integrated vapor barrier 400 may be attached to the body of the tube 10a at one end 42 via a heat mold or other affixing means. In some embodiments, the integrated vapor barrier 400 is a sleeve that extends a distance over the end 41a of the tube 10a and forms an attachment at end 42 via compression when tube 10a is filled.

Also shown in FIG. 4B is the end 41b tube 10b inserted into the opening 47 of the opposite end 43 of the vapor barrier 400. In one embodiment, the end 41b of tube 10b is inserted into the opening 47 prior to the filling of tube 10b. In turn, when the tube 10b is filled, the body of the tube 10b expands to form an attachment with end 43 of the vapor barrier 400 via compression. Accordingly, when the integrated vapor barrier 400 is constructed from a watertight material, fluid intrusion between abutting tube ends 41a, 41b may be mitigated.

As shown in FIG. 4C, a tube 10a comprises an integrated vapor barrier 400 disposed proximate to the end 41a of is flexible body. The integrated vapor barrier 400 may be attached to the body of the tube 10a at one end 42 via a heat mold or other affixing means. In some embodiments, the integrated vapor barrier 400 is a sleeve that extends a distance over the end 41a of the tube 10a and forms an attachment at end 42 via compression when tube 10a is filled.

Also shown in FIG. 4C is the end 41b tube 10b inserted into the opening 47 of the opposite end 43 of the integrated vapor barrier 400. In one embodiment, the end 41b of tube 10b is interlocked with the end 41a of tube 10a within the integrated vapor barrier 400. For example, the tube 10 ends 41 may be rolled together and the integrated vapor barrier 400 extended over the interlocked tube 10 ends to insert tube 10b into the opening 47 prior to the filling of the tubes 10.

In turn, when the tubes 10 are filled, the bodies of the tubes 10 expand within the integrated vapor barrier 400 to form an attachment at end 43 (and at end 42 in a sleeve configuration) of the integrated vapor barrier via compression. Additionally, the interlocked tube ends 41 expand against each other within the vapor barrier 400 when the tubes 10 are filled, which securely joins the two tubes together as they are compressed within the walls of the integrated vapor barrier. Accordingly, when the vapor barrier 400 is constructed from a watertight material, fluid intrusion between abutting tube ends 41a, 41b may be mitigated and the interlocking of the abutting tube ends 41a, 41b secures the tubes 10a, 10b from being pulled apart.

Figure 5:
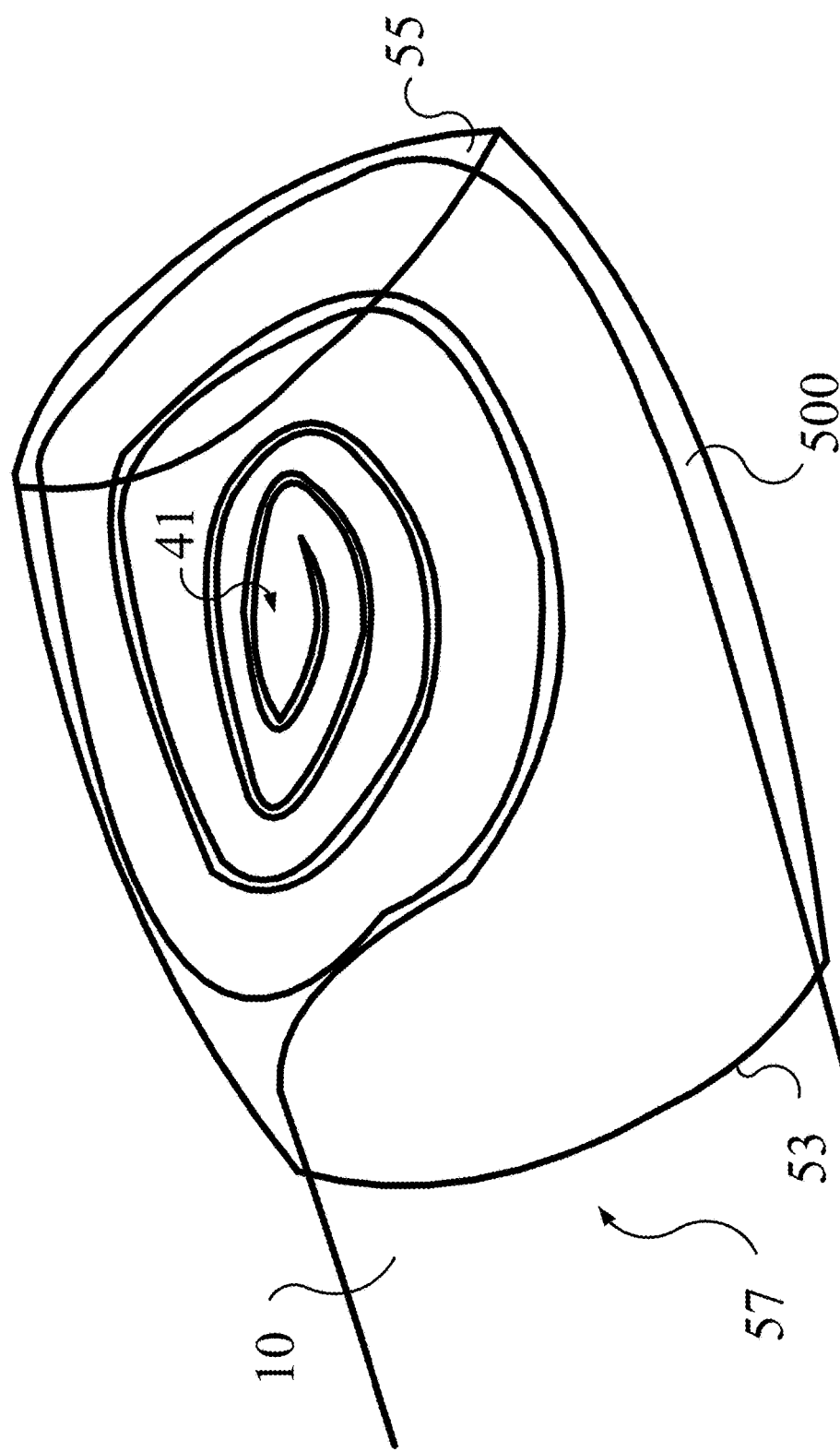
FIG. 5 is a diagram illustrating a sleeve end for a flexible containment tube according to an example embodiment.

FIG. 5 is a diagram illustrating a sleeve end 500 according to an example embodiment. As shown in FIG. 5, a tube 10 according to one embodiment is inserted into a sleeve end 500. The sleeve end 500 includes an opening 57 at one end 53 to receive the tube 10 and is enclosed at the other end 55. The opening 57 of the sleeve end 500 extends a distance (e.g., 1-3 feet) over the end 41 of the tube 10 to form an attachment at end 53 with the body of the tube 10 via compression when tube 10 is filled. The end 41 of the tube 10 may be rolled prior to insertion into the sleeve end 500 to decrease the length of the flexible body extending from the opening 57, and thus reduce the length of a given tube 10 to a shorter length as desired.

The rolled end 41 tube 10 is inserted into the opening 57 of the sleeve end 500 prior to the filling of tube 10. In turn, when the tube 10 is filled, the body of the tube 10 expands within the sleeve end 500 to form an attachment with end 53 of the sleeve end 500 via compression to prevent the tube from expanding to its full length. In such a way, a shorter length of tube may be configured from a longer length of tube. Additionally, the tube 10 may be abutted to another tube at end 55 of the sleeve.

In one embodiment, the sleeve end 500 is a watertight material, such as poly visqueen, rubber, etc. or other material similar to that used to construct the tube 10 of vapor battier 15, to prevent intrusion of fluid through its surface.

FIG. 6A and FIG. 6B are diagrams illustrating flexible containment tube connectors 63 according to example embodiments. FIG. 6A illustrates a linear tube connector 63a according to one embodiment. In one embodiment, a flexible containment tube is not sealed at one or more of its ends. In such embodiments, a connector may seal the end of the flexible containment tube, and optionally couple multiple flexible containment tubes. As shown in FIG. 6A, a tube includes a top side 60a and a bottom side 60b that are not sealed at the end of the tube. Instead, connector 63a secures the end of the tube to form a seal between the top side 60a and the bottom side 60b of the tube at its end such that fluid 61 may be contained within the flexible body.

In one embodiment, the connector 63a includes a first cavity 64a to receive a portion of the end of the tube. The portion may be formed by rolling the end of the tube such that the top side 60a of the tube is rolled with the bottom side 60b of the tube. The rolled end of the tube may then be inserted into the first cavity 64a. The length of the connector 63 and thus the first cavity 64a may extend a distance similar the diameter of the tube (e.g., up to the width of the top side 60a and the bottom side 60b of the tube when unfilled) such that rolled end of the tube may be wholly or mostly enclosed within the first cavity 64a.

A second cavity 64b is shown for ease of explanation and includes features similar to the first cavity 64a. The second cavity 64b may also receive a rolled end of a tube in a way similar to that of the first cavity 64a as explained above. The cavities 64a, 64b may be separated by an inner wall 65 of the connector 63. In embodiments where only a single cavity (e.g., first cavity 64a) is needed, the inner wall 65 of the connector 65 may remain to maintain the first cavity 64a. As shown, a cavity 64, and specifically referring to second cavity 64b as a reference, includes an upper retaining lip 67a and a lower retaining lip 67b. Other embodiments may include only a single retaining lip 67 per cavity 64. A retaining lip 67 secures the rolled end of a tube within a cavity 64 to prevent removal of the rolled end when pulled upon in a direction away from the connector 63. Further, when the tube is filled, a side 60 of the tube expands against a retaining lip 67 and the rolled portion expands within the cavity 64 against the retaining lip 67 and walls (e.g., 65) within the cavity to prevent the rolled end of the tube from being removed, and thus also sealing the end of the tube within the cavity 64 to prevent the release of fluid 61 within the tube.

FIG. 6B illustrates a stacked tube connector 63b according to one embodiment. The stacked tube connector 63b differs from the linear tube connector 63a of FIG. 6A in that the space between the tube ends connected via the stacked tube connector 63b is reduced. Thus, for example, tube connector 63b may mitigate the use of a vapor barrier and/or amount of vapor barrier material used between connected tube ends.

FIG. 7A through FIG. 7E are diagrams illustrating flexible containment tube abutments according to example embodiments. In one embodiment, flexible containment tube ends are formed in different shapes to mitigate seepage of fluid between abutting tube ends. The abutments may be solid or flexible and constructed from, for example, materials such as PCV, molded plastic, metals, etc.

As shown in FIG. 7A1, tube 70a is constructed with a slanted tube end 71a. Slanted tube ends 71a may be at a substantially 45 degree angle such that either a right angle corner or straight section may be formed between two tubes having a configuration of tube 70a by abutting two slanted tube ends 71a together. Tubes may be configured with other angles as desired.

As shown in FIG. 7B1, tube 70b is constructed with a flat tube end 73a. Flat tube ends 73a may be abutted at their face to form a straight section from two tubes. Alternatively, a flat tube end 73a may be abutted against a body of another tube to form a right angle or against a slanted face, such as the 45 degree slant end 71a shown in FIG. 7A1 to extend at an angle.

As shown in FIG. 7B2, a tube abutment 72b includes a cavity for inserting a flexible containment tube 10 with a round end (or other shaped end). In this way, tubes 10 themselves need not be constructed with a particular shaped end. When filled, the tube 10 may expand against the walls of the cavity of the tube abutment 72b. In one embodiment, the cavity is shaped 74 to conform to the round end of the tube 10. Other embodiments of a tube abutment 72b may include a cavity shaped 74 to conform to other tube end types such as 71a, and 73b, of FIG. 7A1 and FIG. 7B1, respectively.

An end 73b of the tube abutment 72b may be configured in a variety of ways to abut to another tube or tube abutment. For example, FIG. 7B2 illustrates tube abutment 72b with a flat end 73b that enables abutment in configurations similar to that of the tube 70b in FIG. 7B1 constructed with a flat tube end 73a.

Referring to FIG. 7A2 as another example, tube abutment 72a includes a slanted end 71b. The slanted end 71b enables abutment in configurations similar to that of the tube 70a in FIG. 7A1 constructed with a slanted tube end 71a. Additionally, the tube abutment 72a may include a cavity for inserting a flexible containment tube 10 with a round end (or other shaped end). Thus, when filled, the tube 10 may expand against the walls of the cavity of the tube abutment 72a. In one embodiment, the cavity is shaped 74 to conform to the round end of the tube 10. Other embodiments of a tube abutment 72a may include a cavity shaped 74 to conform to other tube end types such as 71a, and 73b, of FIG. 7A1 and FIG. 7B1, respectively.

FIG. 7C illustrates a two-tube abutment 72c for receiving tube 10a and tube 10b. Accordingly, the two-tube abutment 72c may include a cavity shaped 74 to conform to each tube end. In some embodiments, two-tube abutments 72c are constructed in other configurations, such with an angle between the two openings. In turn, a corresponding angle is formed between tube 10a and tubes 10b when the tubes are inserted. In this way, the tubes 10 may be abutted by the two-tube abutment 72c to join diversion dike sections in a desired shape.

FIG. 7D illustrates a first tube abutment 72d1 configured to receive a first tube 10a and including a shaped face to receive a second tube abutment 72d2. Similarly, the second tube abutment 72d2 is configured to receive a second tube 10b and includes a shaped face to receive the first tube abutment 72d1. The configuration of the corresponding faces of tube abutments 72d1 and 72d2 when mated as shown may be such that force against the tubes 10 in one or more directions is resisted to prevent shifting of the tubes when containing or diverting a fluid.

FIG. 7E illustrates a cavity 74 of a tube abutment 72 according to one embodiment. The end 77 of the tube abutment 72 may be configured similar to, for example, abutment end 71b in FIG. 7A2, abutment end 73b in FIG. 7B2, or in another configuration. As shown, the portion of the tube abutment 72 that extends over the tube end and onto the flexible body of a tube when the tube end is fully inserted to the end shaped 74 portion of the cavity may include a narrowed section 75 at its end. The narrowed section 75 aids in gripping the body of the tube as it expands within the receiving cavity when filled to prevent removal of the tube from the tube abutment 72.

Figure 8B:
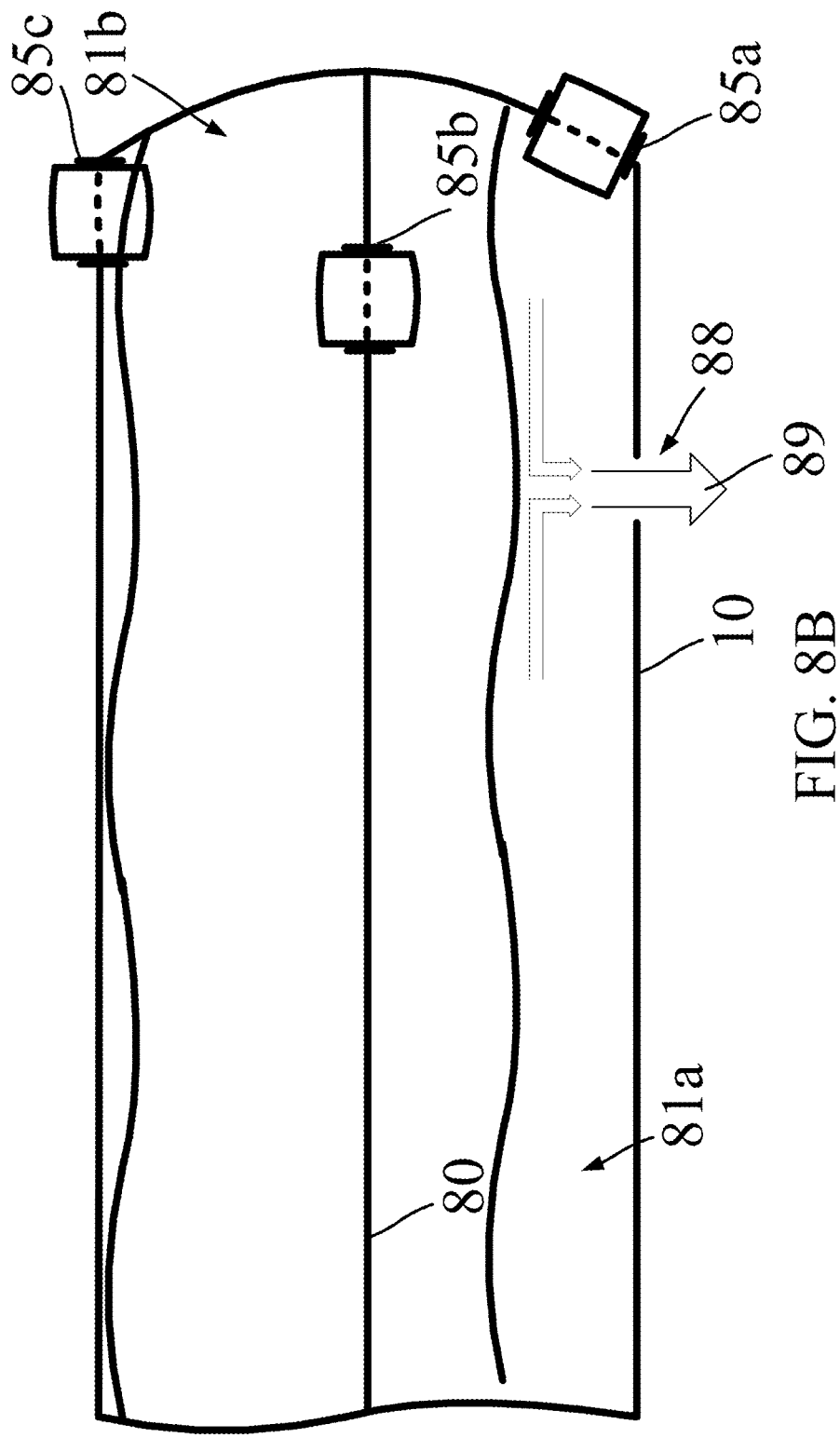
Figure 8C:
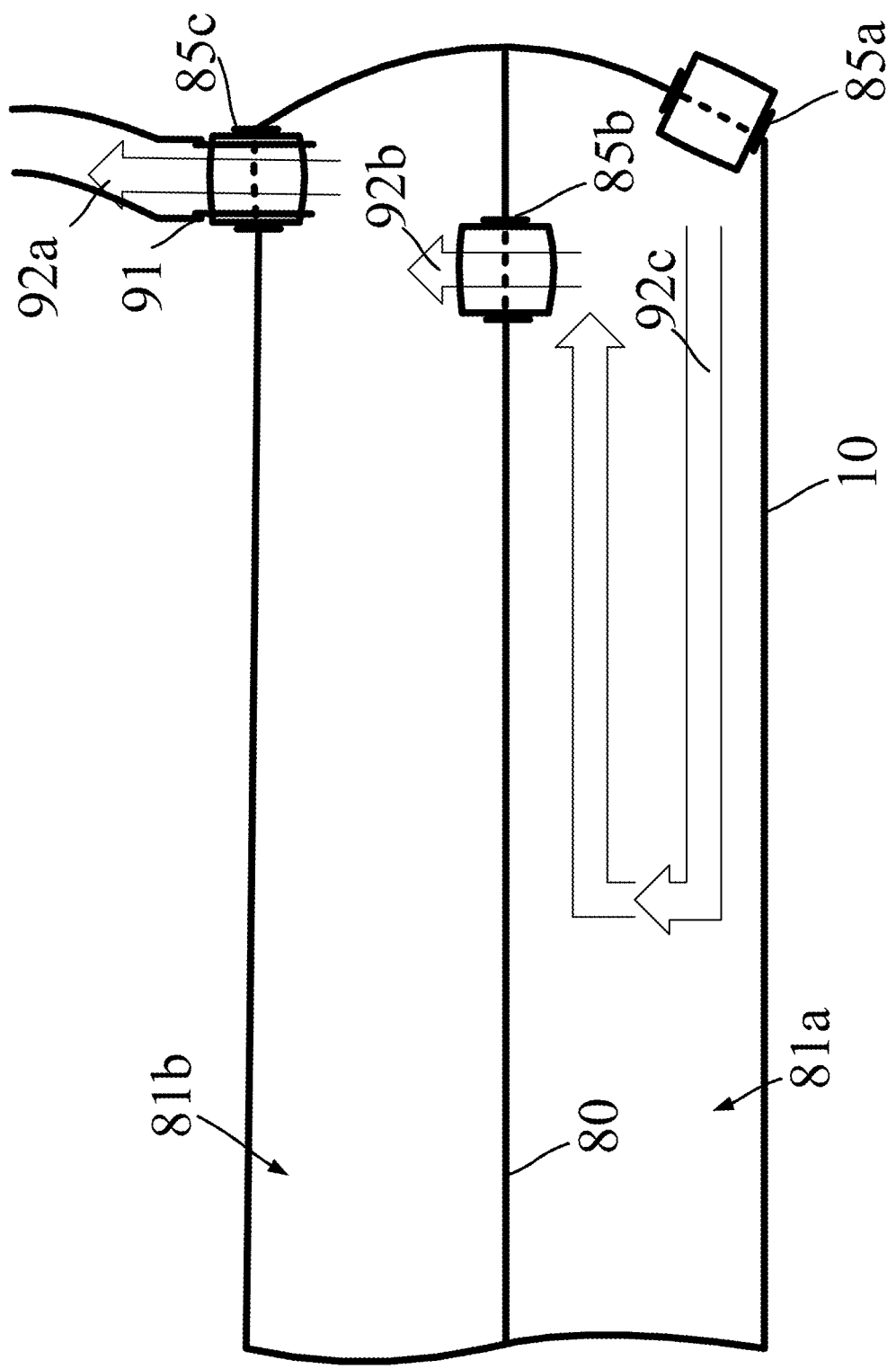

FIG. 8A through FIG. 8C are diagrams illustrating a valve system of a flexible containment tube 10 according to an example embodiment. In one embodiment, the tubes 10 described herein utilize airtight check valves 85 that enable a tube to be pressurized and filled to its maximum capacity. The check valve 85 also enables filling of tubes from the base of an incline in order to force fluids uphill in situations with uneven terrain.

FIG. 8A is a diagram illustrating an example tube configuration for filling a flexible containment tube 10 with a valve system, according to one embodiment. As shown, tube 10 includes an inner membrane 80 forming multiple chambers 81 within a single tube 10. In FIG. 8A, a single inner membrane 80 is shown forming a lower chamber 81a and an upper chamber 81b. An inner membrane 80 may be formed of a material similar to that of the tube body 10, and as such, may be watertight to separate the fluids in each chamber 81. A valve 85 may be disposed within the membrane 80 to facilitate the flow of fluid from one chamber to the next, but not vice versa. For example, valve 85b may facilitate the flow of fluid 87c from the lower chamber 81a to the upper chamber 81b but not from the upper chamber to the lower chamber.

A valve 85a disposed in the body of the tube 10 corresponding to the lower chamber 81a may receive fluid 87a from a connection with a hose 83 or pump, which in turn flows into the lower chamber. The valve 85a may prevent the release of fluid from the lower chamber 81a when the connection with the hose 83 is terminated.

Fluid 87a received via valve 85a flows into and fills 87b the lower chamber 81a. When the fluid filling 87b capacity of the lower chamber is eventually reached, valve 85b permits the flow of fluid 87c from the lower chamber into the upper chamber 81b. Thus, receiving additional fluid 87a into the lower chamber 81a causes the upper chamber 81b to fill 87d with fluid. Valves 85a and 85b may also be of similar construction to reduce the number of components required for tube 10 construction. A valve 85c disposed in the body of the tube 10 corresponding to the upper chamber 81b may permit the release of gas/fluid from the upper chamber 81 to the outside of the tube 10. In some embodiments, valve 85c includes a pressure release that activates to release fluid from the upper chamber 81b when a maximum fill pressure condition is experienced. Valve 85c may also include a release mechanism that is engaged to empty fluid from the tube 10.

FIG. 8B illustrates an example benefit of the valve and tube configuration of FIG. 8A in the event of a puncture 88 or other failure of the tube 10 body corresponding to the lower chamber 81a. As shown, the lower chamber 81a of a filled tube 10 is punctured and fluid 89 escapes from the lower chamber 81a via the puncture. However, because fluid in the upper chamber 81b can neither pass through the membrane 80 nor the valve 85b into the lower chamber 81a it does not escape through the puncture 88. Valves 85a and 85c also do not release fluid from the upper chamber 81b. Hence, the fluid level in the upper chamber 81b is maintained to prevent complete failure of the tube 10.

In scenarios where the upper chamber 81b is punctured, fluid from both chambers may escape in the example configuration of tube 10. However, because the lower chamber 81a is most likely to experience a puncture, such a scenario is less likely.

FIG. 8C illustrates an example of emptying a tube with the valve configuration of FIG. 8A. As shown, a connector 91 attached to a hose engages a release mechanism of valve 85c (e.g., opens a pressure release) to release fluid 92a from the upper chamber 81b. As fluid is released from the upper chamber 81b, valve 85b allows fluid 92b to pass from the lower chamber 81a past the membrane 80 to the upper chamber such that fluid 92c within the lower chamber 81a is also emptied. In some embodiments, the valve 85c is of similar configuration to valves 85a, 85b to reduce manufacturing costs. In such cases, valve 85c may be a check valve that does not include a pressure release and the connector 91 when inserted forces open the check valve.

Example Structure Supported Dike Configurations

FIG. 11A is a diagram illustrating an example supporting structure for a flexible containment tube according to an example embodiment. As shown, a supporting structure 1000A is positioned on a ground surface 101 for illustrative purposes. The supporting structure 1000A comprises a number of supports 1001 that give shape and rigidity to the structure. Supports may be constructed from a number of suitable materials, including plastic composites such as PVC, metals such as steel or aluminum, wood products, or various composites.

The example supporting structure 1000A has a square cross section and may be constructed to a given length. In various embodiments described herein, the supports 1001 may allow for adjustments to the length of the supporting structure 1000A and/or its height and/or width to adjust its cross sectional perimeter and/or cross sectional shape. As shown, the example supporting structure 1000A with a square cross section has a square left end face 1010A and square right end face 1010B. Other example supporting structures may have cross sections that are rectangular, triangular, or other shapes, and thus can have end faces 1010A,1010B of the shape corresponding to the cross section. The example supporting structure 1000A also has four non-end faces, including front face 1010C, bottom face 1010D along the ground plane 101, rear face 1010E, and top face 1010F. Other example supporting structures may have fewer or more of these non-end faces, for example, a supporting structure with a triangular cross section may have three non-end faces that include a front face, bottom face, and rear face, a supporting structure with a half circle cross section may have two non-end faces that include a bottom face and a curved face, and a supporting structure with a cross section having more vertices than a square may have any number of additional non-end faces beyond four.

As mentioned previously, supporting structures, such as supporting structure 1000A may be utilized to construct a section of structure supported containment dike. For example, supporting structure 1000A may be inserted into a flexible containment tube, which is then filled, to construct the section of structure supported dike. Multiple sections of structure supported dike may be abutted together and/or stacked to make a structure supported dike section of any length and/or height. The length of the supporting structure 1000A and thus the length of the structure supported dike section may be any length up to the length of flexible containment tube minus a minimum fold length. The minimum fold length defines the amount of leftover flexible containment tube material necessary to allow for sealing of the tube such that it can be filled. For example, if a flexible containment tube is 20 feet long and has one open end to be sealed, the supporting structure may be 1-17 feet long to allow for sealing with an example minimum fold length of 3 feet. If the flexible containment tube is 20 feet long and open at both ends, the supporting structure may be 1-14 feet long to allow for sealing with an example minimum fold length of 6 feet (3 feet utilized at each end).

As an example flexible containment tube may range to approximately 100 feet long, the flexible containment tube may be cut to smaller lengths as desired to accommodate a given application. For example, if a first entryway within which a structure supported dike section is to be placed is 3 feet wide, a second is 6 feet wide, and a third is 20 feet wide, a 100 feet long tube may be cut to accommodate all three. If the 100 feet long tube is sealed at both ends, two tubes with a sealed end and a multitude of tubes with both ends open may be created. For the above example and considering a 3 feet minimum fold length, example tubes of 6 feet (one closed end) and 12 feet (both ends open) may be cut from one end of the 100 feet tube, leaving 82 feet of tube length remaining. The 6 feet section of tube (3 feet+3 feet minimum fold length for one open end) may be utilized for the first entryway, the 12 feet section of tube (6 feet+6 feet minimum fold length for two open ends) for the second entryway, and the 82 feet section of tube for the third entryway. In turn, three corresponding supporting structures 1000A may be constructed and utilized to create structure supported dike sections for each entryway. For example, a first supporting structure approximately 3 feet long that fits within the first entryway may be utilized in combination with the 6 feet long tube to seal the first entryway with a first structure supported dike section. Similarly, a second supporting structure of approximately 6 feet long may be created for the second entryway and utilized with the corresponding tube to seal the second entryway with a second structure supported dike section. Likewise, a third supporting structure may be created for the third entryway and utilized with the corresponding tube to seal the third entryway with a third structure supported dike section. In some embodiments, a supporting structure of a given length may include multiple supporting structures of shorter lengths. For example, the third supporting structure of approximately 20 feet in length may be comprised of four 5 feet long supporting structures. A given supporting structure need not be fit exactly to the width of the entryway as the tube when filled is allowed to expand laterally, up to several inches, to form a seal at the edges of the entryway or other structure(s) it is abutted to. The lateral expansion along the length of the tube in a structure supported dike section enables sealing action against framing or edges of an entryway and affords less precision in constructed length of a supporting structure. For example, the supporting structure for sealing a given entryway may be constructed 1-6 inches shorter than the width of the entryway to allow for ease of positioning.

As an example flexible containment tube may range in diameter from 1 foot to exceeding 3 feet, and thus may have a circumference (pi*diameter) ranging from approximately 3 feet (37.7") to 9 feet (113"), the example supporting structure 1000A may be constructed such that the perimeter of its cross section corresponds to the circumference of the tube being used. A tube with an unfilled diameter of 1 foot, or 12", has a circumference of 37.7" (pi*12"). As the supporting structure 1000A is inserted into the tube, it is often preferable to have a cross sectional perimeter length slightly less than the circumference of the tube to allow for ease of insertion. Thus, for example, an estimate of tube circumference may be used to compute a cross section perimeter that is less than, but close the tube circumference. One example computation for cross section perimeter may be simply substituting "3" for pi in the circumference calculation in order to obtain a cross section perimeter that is slightly less than the actual circumference (e.g., because pi is 3.14 . . . ). Thus, an example cross section perimeter for a supporting structure 1000A to utilize for a tube with a diameter of 1 foot may be 3 feet/36" (3*12"=36"); a perimeter of 6 feet/72" (3*24"=72") for a tube with a diameter of 2 feet; a perimeter of 9 feet/108" (3*36"=108") for a tube with a diameter of 3 feet, and so on for a tube of any given diameter.

For the example supporting structure 1000A, the cross section perimeter is the sum of the sides of its shape. Thus, for a tube with a 1 foot diameter and having a 37.7" circumference, supporting structure 1000A having a square cross section may have four 9" sides for a total perimeter length of 36" to allow for ease of insertion into the 1 foot diameter tube. For cross sections of other shapes, such as a rectangle or a triangle, a similar computation may be made to ensure the perimeter of the cross section is approximately 36" by adding up the lengths of the sides. For example, a 6"×12" rectangle having four sides and a perimeter length of 36" (6+6+12+12) or a 9"-12"-15" triangle having three sides and a perimeter length of 36" (9+12+15) may also be used as supporting structures for a tube with a 1 foot diameter.

Cross sectional perimeter is similarly applicable to tubes with greater and smaller diameters. For example, for a tube with a diameter of 2 feet and having a 75.4" circumference, the cross section perimeter for a supporting structure may calculated by 3*24" which equals 72". In turn, the supporting structure for the 2 feet diameter tube may have a square cross section with four 18" sides, a rectangular cross section with two 12" and two 24" sides, a triangular cross section with 18", 24" and 30" sides, and so on where the sum of the sides making up the perimeter of each adds to 72".

The actual cross section perimeter of a supporting structure need not be held exact to the computed cross sectional diameter in practice. Specifically, the computed cross sectional perimeter provides a reference point for constructing a supporting structure allowing for ease of insertion into a tube of a given diameter, in practice the actual cross section perimeter may vary up to the tube circumference to below the computed cross sectional perimeter.

FIG. 11B is a diagram illustrating an example supporting structure for a flexible containment tube according to an example embodiment. As shown, a supporting structure 1000B is positioned on a ground surface 101 for illustrative purposes. The supporting structure 1000B comprises a number of supports 1001 that give shape and rigidity to the structure. Supports may be constructed from a number of suitable materials, including plastic composites such as PVC, metals such as steel and aluminum, wood products, or various composites. Also illustrated are a number of example corner joints 1005 and center joints 1006 for joining one or more supports 1001 together.

As shown, the example supporting structure 1000B has a square cross section. Accordingly, the supporting structure 1000B may utilize eight corner joints 1005 (four at each end), although only one end is shown. In instances where multiple supports 1001 are utilized along the length of the supporting structure 1000B, one or more center joints 1006 (e.g., four for a square cross section) may be utilized to couple lengthwise supports together and additionally provide additional reinforcement between supports. The joints 1005, 1006 may have a number of coupling interfaces corresponding to the cross section of the shape, for example, illustrated joints 1005, 1006 have 3 and 4 coupling interfaces, respectively, positioned at 90 degree angles to allow for construction of supporting structures 1000B with square and rectangular cross sections. Joints may have coupling interfaces at different angles for differently shaped cross sections, such as triangles. The variations are numerous and FIG. 11B merely serves to show one example configuration that can be extended to other shapes.

Embodiments of the joints 1005, 1006 themselves may vary depending on the material of the supports. For example, embodiments of joints may have threaded interfaces, compression interfaces, and loose fit interfaces to accept circular supports (e.g., PVC or metal pipe, wooden dowels, etc.) which are all equally applicable as the structure is contained within a tube having corresponding length and circumference close to the cross sectional perimeter. In one embodiment, the joints are PVC or metal joints with circular threaded, compression, and/or loose fit interfaces having an inside or outside diameter configured to accept PVC or metal pipe supports having a corresponding outside or inside diameter and/or thread pitch. Compression and/or loose fit interfaces may also be square or another shape to receive supports of a corresponding shape. Additionally, embodiments of joints may be plates (e.g., sheet metal plates) having extended interface portions to which supports such as 2×4 wood supports, angle iron, channel iron, box iron, or I beams (which may be iron, steel, aluminum or other metal) and may be fastened together with screws, nails, or bolts or received therein. Other configurations are also possible and the above description should not be considered limiting. In practice, the supports 1001 are cut or adjusted to a desired length and joined together by way of a number of joints 1005, 1006 as applicable to create a supporting structure 1000B of the desired shape and length.

Figure 11C:
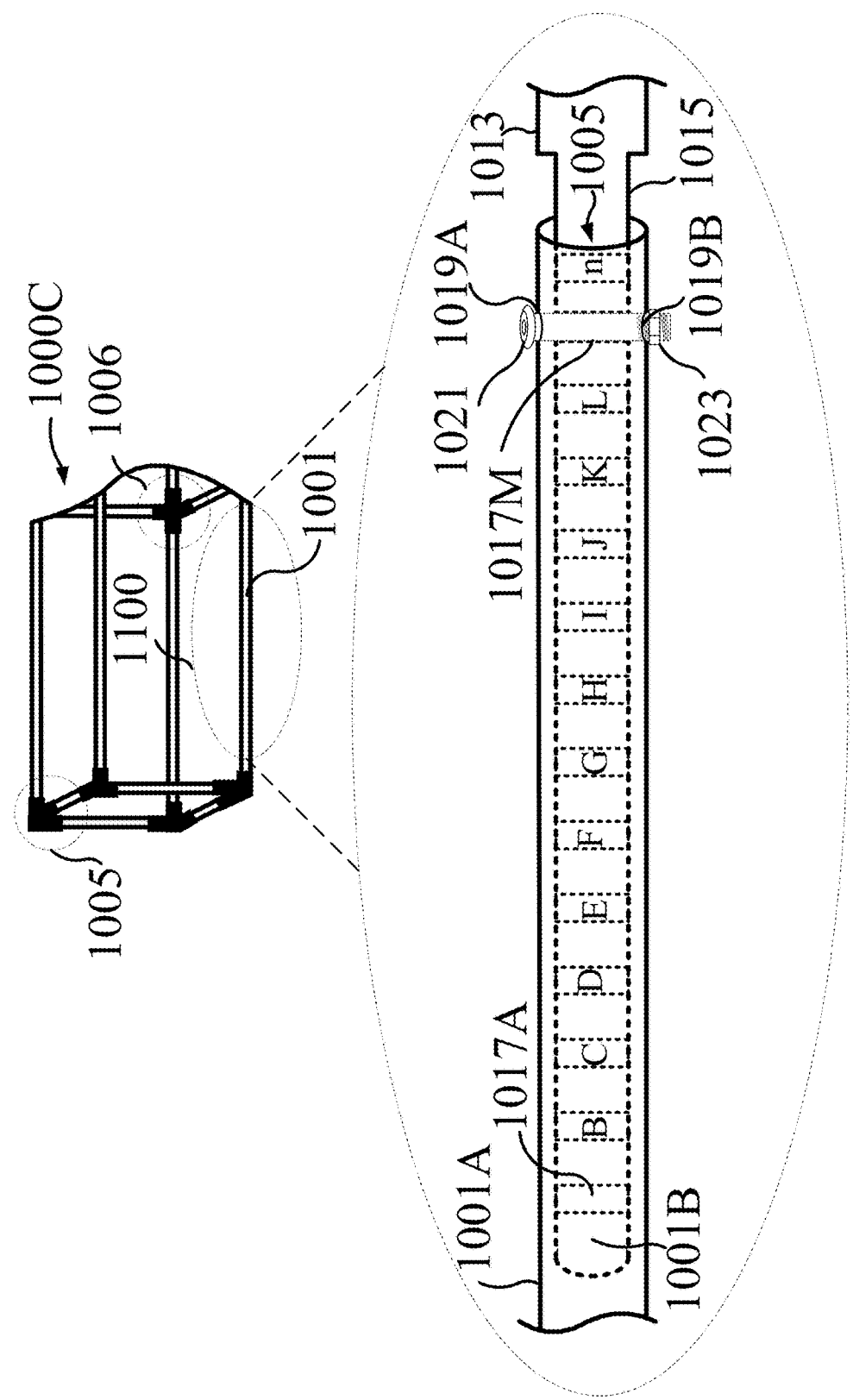

FIG. 11C is a diagram illustrating an example supporting structure for a flexible containment tube according to an example embodiment. More specifically, FIG. 11C illustrates an expanded view 1100 of an example adjustable support 1001 configuration for adjusting dimensions of example supporting structure 1000C.

As mentioned previously, a supporting structure 1000C may be constructed to a given length such as to correspond to the width of an entry way or a maximum allowed length for a given length of flexible containment tube. Additionally, a supporting structure 1000C may be constructed to have a given cross section perimeter so as to correspond to the circumference of the flexible containment tube it will support. In some embodiments, it may be desirable to have adjustable supports 1001 to allow for a range of support lengths. Depending on the configuration of the adjustment, an adjustable support 1001 may have an adjustment range from a maximum length to approximately half the maximum length for a single telescoping adjustment. Thus, for example, an 18" support may be adjusted to approximately 9" or a 12" support to approximately 6". In this way, adjustable supports 1001 may be adjusted to a desired length to effect changes to the length of the supporting structure 1000C or cross sectional perimeter of the supporting structure 1000C. In other embodiments, a support 1001 may include multiple telescoping sections (e.g., nested or otherwise) to provide a greater range of adjustment, such as approximately 3 or 4 times longer than a minimum length.

Further, the adjustable nature of the supports may allow for the use of different cross section shapes while maintaining a given cross sectional perimeter. For example, adjustable supports of 12" in maximum length may be utilized for a 9-9-9-9 square cross section or a 6×12 rectangle cross section depending on the desired application. Similarly, along the length of the support structure 1000C, supports with an 18" maximum length may be used to adjust the length of the structure from 18" to 9" or in conjunction with center joints and a set of additional 18" maximum length supports to obtain a structure ranging from 18" to 36" in length. Any number of additional supports and center joints may be utilized to adjust the length of a structure as desired.

The example adjustable support 1001 has an outer support portion 1001A and an inner support portion 1001B. The inner support portion 1001B has an outside diameter 1015 less than the inside diameter of the outer support portion 1001A to allow for insertion 1005 of the inner support portion 1001B and adjustment of support length 1001 via telescoping of the inner support portion further into or out of the outer support portion 1001A. The outer support portion 1001A may include one or more holes 1019A, 1019B to allow for insertion of a fastener 1021 to secure the inner support portion 1001B to a particular length. In one embodiment the fastener 1021 is threaded such that it may be secured via a nut 1023. The inner support portion 1001B includes a number of corresponding channels 1017A-n to receive the fastener and maintain the position of the inner support portion 1001B within the outer support portion

1001A. As shown, fastener 1021 is securing the inner support portion 1001B with the outer support portion 1001A via insertion through holes 1019A, 1019B of the outer support portion and channel 1017M of the inner support portion. Any of channels 1017A-n may be used to adjust the length of the support 1001 between a given maximum length at channel 1017A and a minimum length at channel 1017n. The number "n" of corresponding channels 1017 depends on the length of the support 1001 and the fineness in adjustment to be permitted. In one example embodiment, channels 1017-n are approximately 0.5-2 inches apart. In alternate embodiments, a compression mechanism, set screws, or other mechanism may secure the outer support portion 1001A with the inner support portion 1001B. The non-inserted end of the inner support portion 1001B may have a larger diameter 1013 than that of the inserted inner support portion 1015 to allow for commonality of fitting at joints (e.g., 1005, 1006).

FIG. 12A is a diagram illustrating an example structure supported containment dike according to example embodiments. As shown, a supporting structure 1000 is utilized in combination with a flexible containment tube 60 to configure a section of structure supported containment dike.

The supporting structure 1000 is shown on a ground surface 101. The example flexible containment tube 60 has a single open end 69 to allow for insertion of the supporting structure 1000. As described previously, the tube 60 can be of varying dimensions, such as having a diameter ranging from approximately 1 to 3 feet and a length that could exceed 100 feet or more. Similarly, the supporting structure 1000 may be of varying dimensions that correspond to the diameter of the tube 60 and the desired length of the structure supported dike section.

Prior to insertion into the tube 60, the supporting structure 1000 may be adjusted and/or constructed to have a desired length such as to fit within the width of a given entryway and adjusted and/or constructed to have a cross section perimeter corresponding to the circumference of the tube. For example, for a tube 60 with a 1 foot diameter, the supporting structure 1000 may be adjusted and/or constructed to have a cross section with a perimeter of 36" to allow for ease of insertion into the 1 foot diameter tube having a circumference of 37.7". Additionally, as described previously, the length of the supporting structure 1000 may be configured to allow for a minimum fold length of the tube 60 to remain once it is inserted into the tube. For example, if the minimum fold length is 3 feet, and the supporting structure is 3 feet long, the tube 60 may be 6 feet long or greater.

Once the supporting structure 1000 is appropriately configured for the application as described above, it may be inserted 1201 into the open end 69 of the flexible containment tube 60.

FIG. 12B is a diagram illustrating an example structure supported containment dike according to example embodiments. As shown, a supporting structure 1000 is utilized in combination with a flexible containment tube 60 to configure a section of structure supported containment dike. FIG. 12B shows the supporting structure 1000 once it has been fully inserted 1202 through the open end 69 the flexible containment tube 60. Also shown is the open end 69 of the tube 60 extending past the supporting structure 1000, e.g., by at least the minimum fold length once the structure has been fully inserted 1202 into the tube. The supporting structure 1000 and tube 60 may be placed in a desired position on a ground surface 101 and the open end 69 of the tube sealed prior to filling.

Figure 12C:
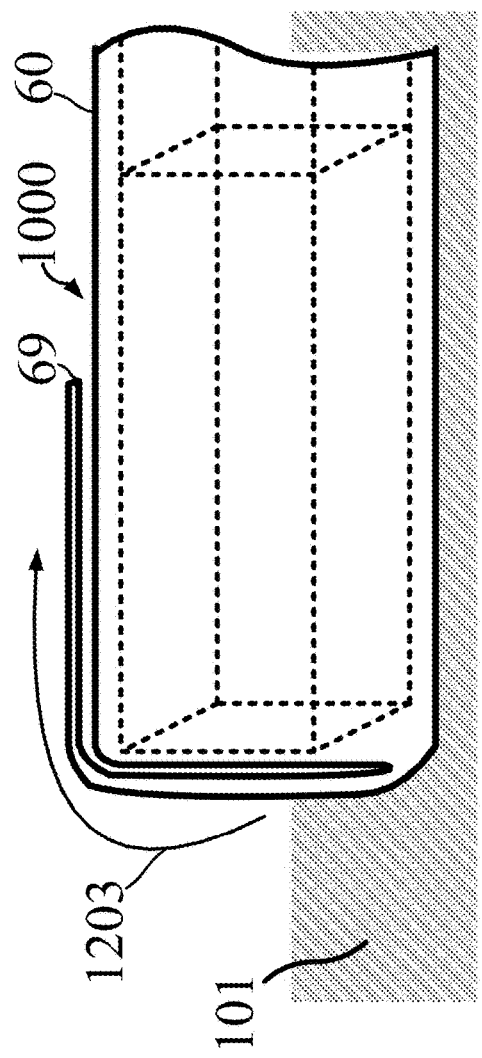

FIG. 12C is a diagram illustrating an example structure supported containment dike according to example embodiments. As shown, a supporting structure 1000 is utilized in combination with a flexible containment tube 60 for configuring a section of structure supported containment dike. FIG. 12C shows the supporting structure 1000 once it has been fully inserted into the flexible containment tube 60 and the open end 69 of the tube 60 has been folded over the top face for sealing. Relative to the ground surface 101, the portion of the open end 69 of the flexible containment tube 60 extending at least the minimum fold length beyond the supporting structure 1000 may be folded 1203 over the end of the supporting structure and onto the top face. Additionally, the open end 69 may be folded back and forth along the top face, e.g., 2-4 times as shown in FIG. 12D, and secured to provide a seal that substantially prevents fluid filling the tube 60 from escaping out the open end 69.

Figure 12D:
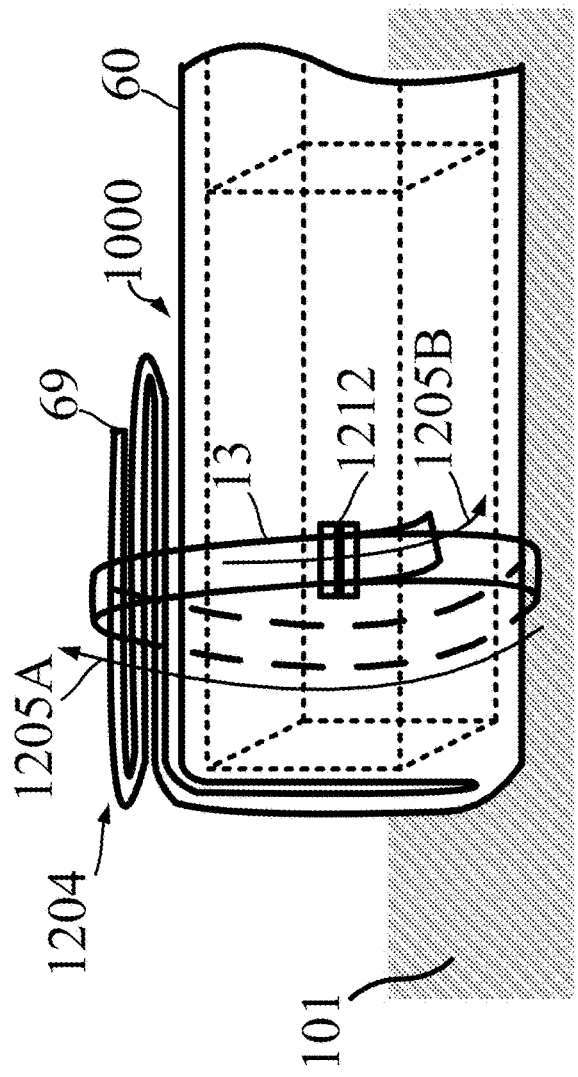

FIG. 12D is a diagram illustrating an example structure supported containment dike according to example embodiments. As shown, a supporting structure 1000 is utilized in combination with a flexible containment tube 60 to configure a section of structure supported containment dike. FIG. 12D shows a strap 13 wrapped around 1205A the structure 1000 and tube 60. The strap 13 is wrapped around the folded portion 1204 of the open end 69 of the tube 60 such that the folded portion 1204 of the tube may be secured to provide a seal. For example, the strap 13 may include a securing mechanism 1212 which an end of the strap can be inserted 1205B to allow for securing of the strap 13 around the supporting structure 1000, tube 60, and folded portion 1204 of the tube 60. Example securing mechanisms 1212 may include ratchets (e.g., a ratchet strap), buckles, cam buckles, etc. that are suitable to prevent the strap 13 from loosening. Alternatively, the strap 13 may be secured to itself (e.g., via a knot) or via other mechanism. As the tube 60 will be filled with fluid once the structure supported dike section is positioned in a desired position (e.g., on ground plane 101), the strap 13 need not be overly tight as the filling of the tube 60 will cause the body of the tube to expand against the strap and further seal the folded portion 1204 of the tube between the main body of the tube and the strap.

Other embodiments may utilize means other than a strap to secure the open end 69 and seal the tube 60. For example, a sleeve end as described in detail with reference to FIG. 5 may be used. An example sleeve end may be a watertight material, such as poly visqueen, rubber, etc. or other material similar to that used to construct the tube 60 to prevent intrusion of fluid through its surface. An example sleeve end may include an open end and a closed end. The opening of the sleeve may extend a distance (e.g., 1-3 feet) over the end of the tube 60 in order to secure the folded portion 1204 of the tube 60 to form an attachment with the body of the tube via compression when tube is filled. The opening of the sleeve may have a circumference proximate to the circumference of the tube or perimeter of the supporting structure and/or stretch such that the opening of the sleeve can extend over the tube 60 and structure to secure the folded end 1204 of the tube. Additionally, in some embodiments, the sleeve may have two open ends to allow the connection of two dike sections. Alternatively, the sleeve may be abutted to another tube or edge of an entryway.

Other example embodiments may utilize a tube abutment. Example tube abutments are described in greater detail with reference to FIGS. 7-7E. A tube abutment includes a cavity for inserting a flexible containment tube 60 and the cavity may have a shape with dimensions that correspond to that of the cross section of the supporting structure. In this way, an end of a structure supported containment tube may be inserted into the cavity. The cavity may extend over the end of the structure supported containment tube (e.g., by 1-3 feet) to allow for the securing of the folded end 1204 of the tube 60. As with the sleeve end, when the tube 60 is filled the tube expands within the cavity and forms a compression fit around the folded end 1204 to seal the tube 60. A minimum fold length of the tube 60 may differ between a strap vs sleeve end vs abutment.

Figure 12E:
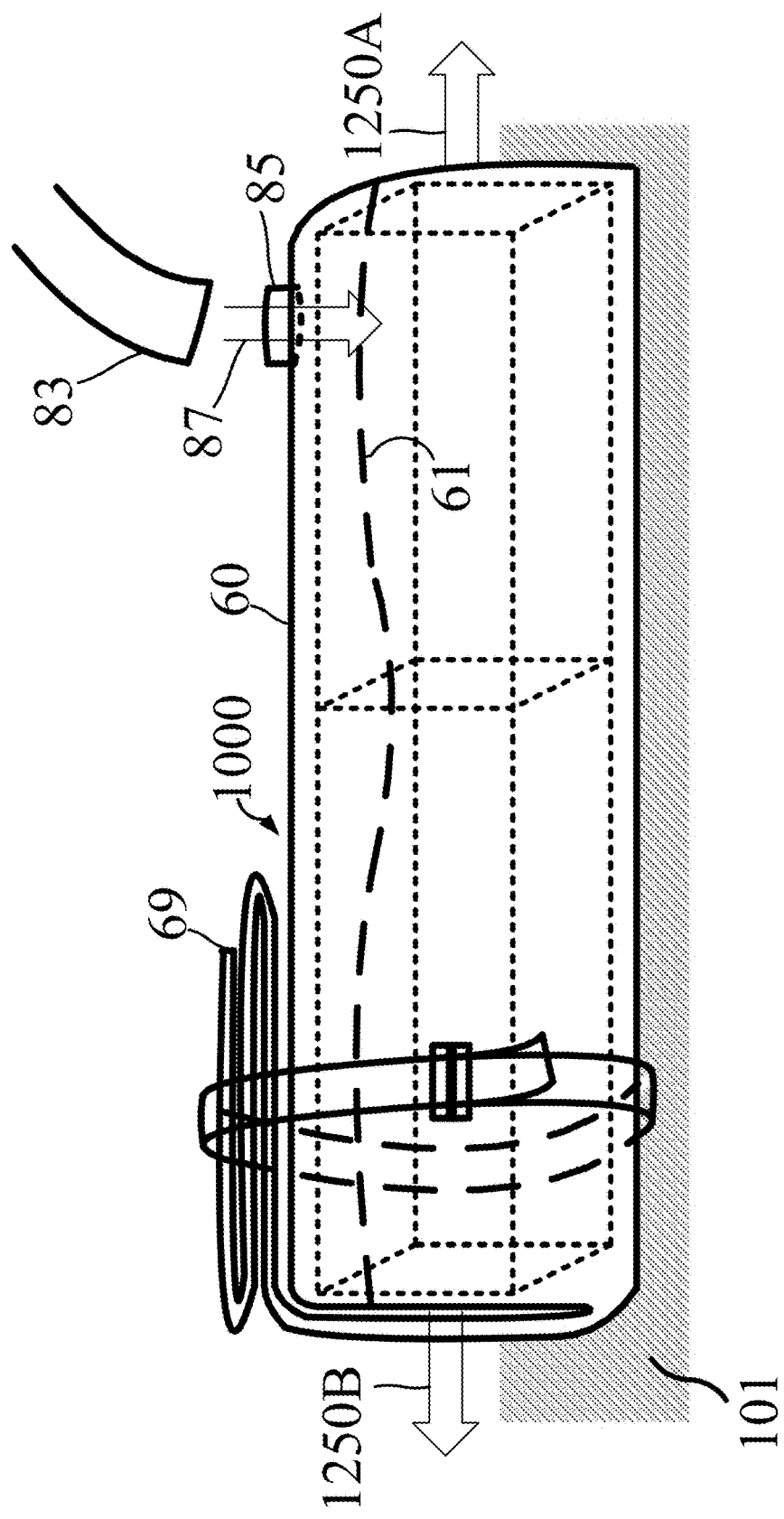

FIG. 12E is a diagram illustrating an example structure supported containment dike according to example embodiments. As shown, a supporting structure 1000 is utilized in combination with a flexible containment tube 60 to configure a section of structure supported containment dike. FIG. 12E illustrates the filling of a section of structure supported containment dike once the section of structure supported containment dike has been positioned in a desired location on the ground plane 101 and the open end 69 of the tube 60 secured. For example, the dike section may be positioned to span the width of an entryway. Embodiments of the tube 60 may include a valve 85 disposed in its flexible body to allow for the filling of the tube. For example, the valve 85 disposed in the body of the tube 60 may receive fluid 87 from a connection with a hose 83 or pump to fill 61 the interior of the tube. In some embodiments, as multiple sections of tubing may be created from a single long flexible containment tube 60, example flexible containment tubes may include a number of valves 85 disposed in the body of the tube. For example, valves 85 may be disposed along the length of the body of a flexible containment tube 60 every 3-12 feet (or other desired spacing) such that smaller tube sections may also include a valve disposed in their body. In addition, multiple valves 85 may be positioned around the circumference of the tube 60, thus ensuring the position of a valve proximate to a top of the structure supported containment tube for filling with fluid and/or a valves proximate to a ground plane of the structure supported contain tube for evacuating fluid. In this way, configurations with multiple values positioned around the circumference of the 60 can easily facilitate the filling and/or evacuating of the tube irrespective of structure supported dike orientation to reduce considerations during construction and reduce effort to deconstruct structure supported containment dikes after use.

In some embodiments, multiple fluids may be utilized to fill 61 the tube 60. For example, both water and air may be utilized as filling fluids such as by filling 87 the tube 60 to $\frac{2}{3}^{rds}$ capacity with water and filling the tube with air for the remaining $\frac{1}{3}^{rd}$ of the capacity so as to minimize the amount of water utilized in filling 61 the tube. The valve 85 may be configured to prevent the release of fluid from the tube 60 when the connection with a hose 83 for filling 87 the tube is terminated. Configurations of valve 85 may also include a release mechanism that can be engaged to empty fluid from the tube 60.

As the tube 60 is filled 67 to its fill 61 capacity, it expands 1250A, 1250B lengthwise and also around its diameter due to pressure of the filling fluid(s) 87 within the tube 60. A fluid like water causes tube 60 expansion according to the internal hydrostatic pressure (i.e., height of the water column above a point) and external pressure at that point, and a fluid like air causes tube expansion according to the internal pressure and external pressure. The material of the tube 60 also plays a part in tube expansion as it resists internal forces, for example, a flexible rubber containment tube may expand to a greater degree than a rubber containment tube utilizing reinforced webbing. When multiple fluids are utilized, the interior pressure at a given point may result from one or both of the hydrostatic pressure and gas pressure. The lengthwise expansion 1250A, 1250B acts laterally and the pressure allows for a compression seal against the edges of an entryway or other surface the structure 1000 is abutted against. The expansion of the tube 60 around its diameter allows for sealing against the ground plane 101 or other surface proximate to a front, rear, bottom, or top face of the structure 1000.

Figure 13A:
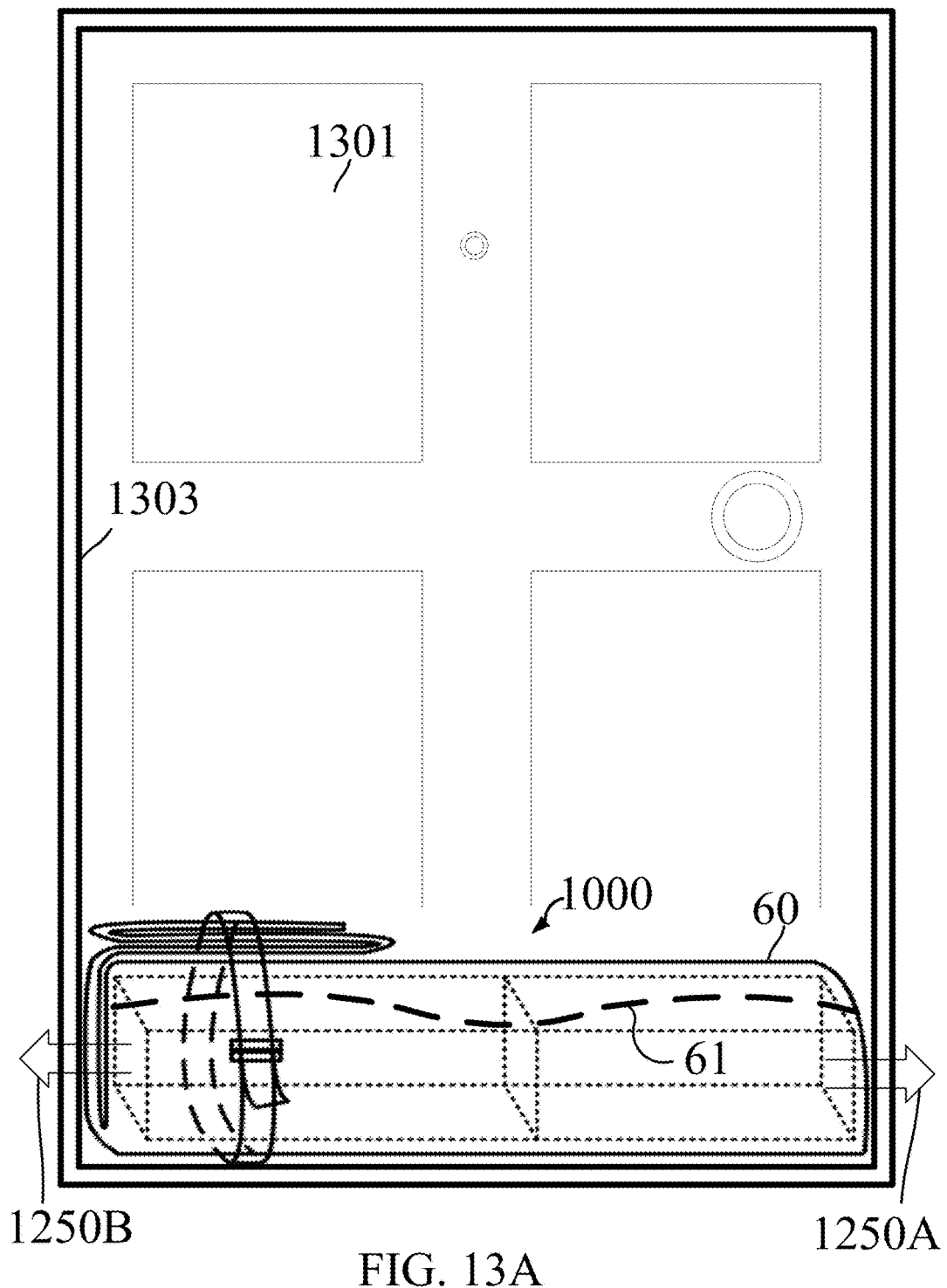

FIG. 13A is a diagram illustrating an example structure supported containment dike application according to an example embodiment. As shown, the structure 1000 supported flexible contain tube 60 constituting a structure supported dike section is positioned within example entryway 1303 along the bottom edge and/or ground plane. As described previously, the structure 1000 may be constructed and/or adjusted for length to allow the structure supported dike section to fit within the width of the entryway 1303. In turn, the structures supported dike section may be positioned within the entryway 1303 and the tube 60 filled 61. When filled 61, the tube 60 expands 1250A, 1250B laterally and seals against the corresponding edges of the entryway 1303. When water (e.g., flood waters) rise up along the front face of the dike section, the hydrostatic pressure created by the rising water exerts pressure on the front face of the dike section which exerts a rearward force on the structure 1000 and tube 60 directed into the entryway 1303. The lateral expansion 1250A, 1250B of the tube 60 when filled 61 acts to maintain the position of the dike section against this force. Additionally, in instances where the entryway 1303 includes a door 1301 or other barrier along the rear face of the structure supported dike section, the hydrostatic pressure of water at the front face of the dike section forces the rear face of the dike section against the door and causes the tube 60 to additionally seal itself against the door 1301 along the rear face within the entryway. The combination of these actions by the dike section and on the dike section act to both secure the dike section within the entryway 1303 and provide sealing of the entryway 1303 that mitigates seepage of floodwaters through the entryway 1303 and into an enclosed area such as a house or garage. Sandbags, in contrast, do not provide a barrier to effectively prevent seepage but to mitigate erosion and/or act as a break to prevent complete breach of a door 1301.

In some embodiments, multiple dike sections may be utilized. For example, one or more additional dike sections may be stacked within the entryway 1303 to mitigate floodwaters exceeding the height of a single section. Further, as described previously, rather than utilizing a structure 1000 with a square cross section, a structure with a rectangular cross section may be utilized and positioned such that the longer sides of the rectangular cross section are aligned vertically with the vertical edges of the entryway 1303 to mitigate floodwaters exceeding the height of a dike section with a square structure. Such a configuration is particularly suited to entryways 1303 including a door 1301 as increase in flood water height at the front face of the dike section forces the dike section rearward against the door which acts to both seal the entryway 1303 and maintain position of the dike section. Alternatively, a structure 1000 with a triangular cross section may be utilized to provide an increase vertical height and provide a stable base. Such a configuration may be desirable to form a break, within an entryway without a door, or positioned forward of one or more other dike sections. For example, one or more dike sections may be positioned and/or stacked in front of a dike section positioned within the entryway 1303. Optionally, these dike section positioned and/or stacked in front of the entryway 1303 may have a length that extends further than the width of the entryway 1303 such that when floodwaters rise the hydrostatic pressure of the floodwaters pushes these barriers both against the dike sections to their rear and edges of the entryway 1303 as they extend past the edges of the entryway.

In some embodiments, a vapor barrier, such as poly visqueen or other material that prevents intrusion of fluid through its surface is positioned prior to placement of one or more dike sections. The vapor barrier may extend laterally to extend past each side of the entryway 1303. One or more dike sections may be placed, filled, and or stacked on the rear end portion of the vapor barrier within the entryway 1303 and/or in front of the entryway. In some embodiments, the rear end portion of the vapor barrier is positioned to provide a seepage gap to allow for additional sealing by action of the hydrostatic pressure within the interior of the dike forcing the vapor barrier against a door 1301 of the entryway and/or the ground plane. Optionally, the front end portion of the vapor barrier may be woven through one or more of the dike sections to better secure the vapor barrier. Once the dike sections are positioned on the rear end portion of the vapor barrier and the front end portion vapor barrier is optionally woven between one or more of the dike sections, the front end portion of the vapor barrier may be extended down the front face of the dike formed by the dike section and extended forward from the entryway in a sloping fashion into the containment area of the floodwaters. Optionally, this front end portion of the vapor barrier extended from the entryway may be anchored with ground anchors and/or weights. As in embodiments previously described, the plastic vapor barrier aids in resisting forces on a dike resulting from the hydrostatic pressure of contained floodwaters. Further, the use of a vapor barrier can provide additional sealing of the entryway 1303 to mitigate seepage of floodwaters through the entryway 1303 and into an enclosed area such as a house or garage.

FIG. 13B is a diagram illustrating an example structure supported containment dike application according to an example embodiment. As shown, two structures 1000 and flexible containment tubes 60 are configured to form a longer dike section. Structure 1000A supports flexible containment tube 60A to form a first dike section and structure 1000B supports flexible containment tube 60B to form a section dike section. The first and section dike sections are abutted to form a longer section of dike. In the illustrated example, the dike sections are abutted within example entryway 1307. As described previously, a structure 1000 may be constructed and/or adjusted for length to allow the dike section to fit within the width of an entryway. However, if the width of the entryway exceeds the adjustment of the structure and/or length of tube available (less the minimum fold length), multiple structures and/or tubes may be used. The illustrated example shows each structure 1000A, 1000B utilized with a corresponding tube 60A, 60B. Alternatively, a single tube of sufficient length may have been utilized with structures 1000A and 1000B inserted into the single tube. In either instances, the structures 1000A, 1000B may be adjusted for length such that their combined length does not exceed the width of the entryway 1307. Other example embodiments may utilize additional structures and/or tubes.

With the structures 1000A, 1000B and tubes 60A, 60B forming the first and second dike sections positioned within the entryway 1307 on the ground plane 101, the tubes 60A, 60B may be filled 61A, 61B. When the first dike section is filled 61A, the tube 60A expands 1250B, 1250C laterally and seals against the edge of the entryway 1307 and the second dike section. Similarly, when the second dike section is filled 61B, the tube 60B expands 1250A, 1250C laterally and seals against the other edge of the entryways 1307 and also with the first dike section. As a result of expansion 1250C, the first dike section and second dike section seal against each other to form a longer dike section within the entryways 1307. When water (e.g., flood waters) rise up along the front face of the dike section, the hydrostatic pressure created by the rising water exerts pressure on the front face of the dike section which exerts a rearward force on the structures 1000A, 1000B and tubes 60A, 60B directed into the entryway 1307. The lateral expansion 1250A, 1250B, 1250C of the tubes 60A, 60B when filled acts to maintain the position of the dike section against this force. Additionally, in instances where the entryway 1307 includes a door 1305 or other barrier, the hydrostatic pressure of water at the front face of the dike section forces the dike section against the door and causes the rear face of the tubes 60A, 60B to additionally seal themselves against the door 1305 within the entryway. The combination of these actions by the dike section (e.g., the expansion of the first and second dike sections against the edges of the entryway 1307 and against each other) and on the dike section act to both secure the dike section within the entryway 1307 and provide sealing of the entryway that mitigates seepage of floodwaters through the entryway 1307 and into an enclosed area such as a house or garage. Sandbags, by contrast, do not provide a barrier to effectively prevent seepage but to mitigate erosion and/or act as a break to prevent complete breach of a door 1305.

In some embodiments, additional dike sections may be utilized. For example, one or more additional dike sections may be stacked within the entryway 1307 in a similar fashion to mitigate floodwaters of a greater height. Further, as described previously, rather than utilizing structures 1000 with square cross sections, structures with rectangular cross sections may be utilized and positioned such that the longer sides of the rectangular cross section are vertical within the entryway 1307 to mitigate floodwaters exceeding the height of a dike section with a square structure. Similarly, a structure 1000 with a triangular cross section may be utilized to increase vertical height and provide a stable base. Additionally, one or more dike sections may be positioned and/or stacked in front of a dike section positioned within the entryway 1307. Optionally, these dike sections when positioned and/or stacked in front of the entryway 1307 may have a length that extends further than the width of the entryway 1303 such that when floodwaters rise the hydrostatic pressure of the floodwaters pushes these barriers against the dike sections to their rear and cannot move as they extend past the edges of the entryway 1307.

In some embodiments, a vapor barrier, such as poly visqueen or other material that prevents intrusion of fluid through its surface is positioned prior to placement of one or more dike sections. The vapor barrier may extend laterally to extend past each side of the entryway 1307. One or more dike sections may be placed, filled, and or stacked on the rear end portion of the vapor barrier within the entryway 1307 and/or in front of the entryway. In some embodiments, the rear end portion of the vapor barrier is positioned to provide a seepage gap to allow for additional sealing by action of the hydrostatic pressure within the interior of the dike forcing the vapor barrier against a door 1305 of the entryway and/or the ground plane. Optionally, the front end portion of the vapor barrier may be woven through one or more of the dike sections to better secure the vapor barrier.

Once the dike sections are positioned on the rear end portion of the vapor barrier and the front end portion vapor barrier is optionally woven between one or more of the dike sections, the front end portion of the vapor barrier may be extended down the front face of the dike formed by the dike section and extended forward from the entryway in a sloping fashion into the containment area of the floodwaters. Optionally, this front end portion of the vapor barrier extended from the entryway may be anchored with ground anchors and/or weights. As in embodiments previously described, the vapor barrier aids in resisting forces on a dike resulting from the hydrostatic pressure of contained floodwaters. Further, the use of a vapor barrier can provide additional sealing of the entryway 1307 to mitigate seepage of floodwaters through the entryway 1307 and into an enclosed area such as a house or garage.

Additional Considerations

In some embodiments, a dike section may be utilized for other purposes beyond flood mitigation. For example, one or more dike sections may be utilized as a safety barrier. Oftentimes cones, plastic, rope, etc. and/or metal and/or wood pop-up barriers are utilized for traffic control to section off areas from vehicular traffic. Such barriers serve to notify drivers that a road or area is closed to traffic but are ineffective in stopping errant vehicles. Concrete barriers such as Jersey barriers can be effective at stopping a vehicle but are cumbersome to move, store, and prohibitive in cost to utilize. Flexible containment tubes are well suited for this task as they are capable of being quickly positioned with a desired shape or formation and are effective in stopping errant vehicles due to their toughness of constructions, size, and weight. Additionally, multiple tubes may be used to construct a barrier of a given height. Structure supported containment tubes can provide additional benefits in stopping errant vehicles as the internal structure further reinforces the flexible containment tube. The internal supporting structure may be configured specifically for this purpose through reinforcement with rebar or wire cabling that resists impact forces to better stop vehicles impacting a side of the structure supported containment tube.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. An apparatus for mitigating flood damage, the apparatus comprising: a supporting structure disposed within an interior of the flexible containment tube and comprising: a cross sectional perimeter, and a length; a flexible containment tube comprising: a circumference greater than or equal to the cross sectional perimeter of the supporting structure, a length greater than or equal to the length of the supporting structure, an opening in the flexible body of the containment tube wherein the opening is large enough to receive the supporting structure, and a valve disposed in a flexible body of the flexible containment tube configured to receive a fluid; wherein the length of the flexible containment tube exceeds the length of the supporting structure by a minimum fold length, wherein the minimum fold length is a minimum length of flexible containment tube necessary to extend past the end of the supporting structure and fold back onto the flexible containment tube to seal the opening of the flexible containment tube.

2. The apparatus of claim 1, wherein the valve disposed in the flexible body of the flexible containment tube is configured to prevent release of the fluid.

3. A method for mitigating flood damage, the method comprising: adjusting a length of a supporting structure based on a width of an entryway; adjusting a cross sectional perimeter of a supporting structure based on a circumference of an opening in the flexible body of a flexible containment tube; inserting the supporting structure into the opening in the flexible containment tube; sealing the opening to form a structure supported dike section, wherein the supporting structure is inside the flexible containment tube; positioning the structure supported dike section within the entryway; and filling the structure support dike section with a filling fluid to laterally expand the flexible containment tube within the width of the entryway and form a seal with a first edge of the entryway; and wherein a length of the flexible containment tube exceeds the length of the supporting structure by a minimum fold length, wherein the minimum fold length is a minimum length of flexible containment tube necessary to extend past the end of the supporting structure and fold back onto the flexible containment tube to seal the opening of the flexible containment tube.

4. The apparatus of claim 1, wherein the length of the flexible containment tube exceeding the length of the supporting structure by the minimum fold length is folded and secured to the flexible containment tube to seal the supporting structure within the flexible containment tube and prevent the release of fluid from the flexible containment tube when filled via the valve.

5. The apparatus of claim 1, wherein the length of the flexible containment tube exceeding the length of the supporting structure by the minimum fold length is secured by a strap, sleeve end, or tube abutment to seal the supporting structure within the flexible containment tube and prevent the release of fluid from the flexible containment tube when filled via the valve.

6. The apparatus of claim 1, wherein the perimeter of the cross section of the supporting structure is less than but proximate to the circumference of the flexible containment tube to allow for insertion of the supporting structure into the opening of the flexible containment tube.

7. The apparatus of claim 1, wherein the supporting structure comprises adjustable supports configurable to adjust the length and/or cross sectional perimeter of the supporting structure.

8. The apparatus of claim 1, wherein the supporting structure has a square, rectangular, or triangular cross section and the cross sectional perimeter is the sum of the sides of the cross section.

9. The method of claim 3, wherein the supporting structure has a square, rectangular, or triangular cross section and the cross sectional perimeter is the sum of the sides of the cross section.

10. The method of claim 3, wherein a valve disposed in the flexible body of the flexible containment tube is configured to receive the filling fluid and prevent release of the filling fluid.

11. The method of claim 3, wherein the length of the flexible containment tube exceeding the length of the supporting structure by the minimum fold length is folded and secured to the flexible containment tube to seal the supporting structure within the flexible containment tube and prevent the release of fluid from the flexible containment tube when filled via a valve disposed in the flexible body of the flexible containment tube.

12. The method of claim 3, wherein the length of the flexible containment tube exceeding the length of the supporting structure by the minimum fold length is secured by a strap, sleeve end, or tube abutment to seal the supporting structure within the flexible containment tube and prevent the release of fluid from the flexible containment tube when filled via a valve disposed in the flexible body of the flexible containment tube.

13. The method of claim 3, wherein the perimeter of the cross section of the supporting structure is less than but proximate to the circumference of the flexible containment tube to allow for insertion of the supporting structure into the opening of the flexible containment tube.

14. The method of claim 3, wherein the supporting structure comprises adjustable supports configurable to adjust the length and/or cross sectional perimeter of the supporting structure.

15. The method of claim 3, wherein positioning the structure supported dike section within the entryway comprises:
   extending a vapor barrier laterally across the entryway;
   positioning the structure supported dike section on a first end portion of a vapor barrier;
   wrapping a second end of the vapor barrier around a rear face of the structure supported containment dike section; and
   extending the second end of the vapor barrier down a front face of the structure support containment dike section and into a containment area.

16. The method of claim 3, further comprising:
   adjusting a length of a second supporting structure based on the width of the entryway and the length of the first supporting structure;
   sealing the second supporting structure within a second flexible containment tube to form a second structure supported dike section;
   abutting the second structure supported dike section to the first structure supported dike section within the entryway; and
   filling the second structure support dike section with a filling fluid to laterally expand the second flexible containment tube within the width of the entryway and form a second seal with a second edge of the entryway and a third seal with the first structure supported dike section.

17. The method of claim 3, further comprising:
   adjusting a length of a second supporting structure based on the width of the entryway;
   sealing the second supporting structure within a second flexible containment tube to form a second structure supported dike section;
   stacking the second structure supported dike section on the first structure supported dike section within the entryway; and
   filling the second structure support dike section with a filling fluid to laterally expand the second flexible containment tube within the width of the entryway and form a second seal with the a second edge of the entryway.

18. The method of claim 3, wherein:
   adjusting the length of a supporting structure based on the width of the entryway comprises adjusting one or more adjustable lengthwise supports of the supporting structure to fit within the width of the entryway, the lateral expansion of the containment tube when filled sealing the structure supported dike sections within the entryway; and
   adjusting the cross sectional perimeter of the supporting structure based on the circumference of the flexible containment tube comprises adjusting one or more adjustable cross sectional supports that define a cross section of the supporting structure to have combined length less than the circumference of the flexible containment tube.

19. The method of claim 3, wherein the entryway is the entryway to a structure susceptible to flood damage.

\* \* \* \* \*

UNITED STATES PATENT AND TRADEMARK OFFICE
CERTIFICATE OF CORRECTION

PATENT NO. : 10,472,786 B2
APPLICATION NO. : 15/885689
DATED : November 12, 2019
INVENTOR(S) : Paul Vickers It is certified that error appears in the above-identified patent and that said Letters Patent is hereby corrected as shown below:

In the Claims

Column 31, Line 57, In Claim 1, after "comprising:", insert --¶--
Column 31, Line 58, In Claim 1, after "comprising:", insert --¶--
Column 31, Line 59, In Claim 1, after "and", insert --¶--
Column 31, Line 59, In Claim 1, after "length;", insert --¶--
Column 31, Line 60, In Claim 1, after "comprising:", insert --¶--
Column 31, Line 61, In Claim 1, after "structure,", insert --¶--
Column 31, Line 63, In Claim 1, after "structure,", insert --¶--
Column 31, Line 65, In Claim 1, after "and", insert --¶--
Column 31, Line 67, In Claim 1, after "fluid;", insert --¶--
Column 32, Line 11, In Claim 3, after "comprising:", insert --¶--
Column 32, Line 12, In Claim 3, after "entryway;", insert --¶--
Column 32, Line 15, In Claim 3, after "tube;", insert --¶--
Column 32, Line 16, In Claim 3, after "tube;", insert --¶--
Column 32, Line 18, In Claim 3, after "tube;", insert --¶--
Column 32, Line 20, In Claim 3, after "and", insert --¶--
Column 32, Line 23, In Claim 3, after "and", insert --¶--
Column 34, Line 22, In Claim 17, after "with", delete "the"

Signed and Sealed this
Sixteenth Day of June, 2020

Andrei Iancu
*Director of the United States Patent and Trademark Office*